United States Patent
Yuki

(10) Patent No.: US 7,844,296 B2
(45) Date of Patent: Nov. 30, 2010

(54) VIDEO MOBILE TERMINAL

(75) Inventor: Yoshinori Yuki, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 742 days.

(21) Appl. No.: 11/796,020

(22) Filed: Apr. 26, 2007

(65) Prior Publication Data

US 2008/0076471 A1     Mar. 27, 2008

(30) Foreign Application Priority Data

Sep. 21, 2006    (JP)  ............................ P2006-256261

(51) Int. Cl.
| | |
|---|---|
| H04M 1/00 | (2006.01) |
| H04M 3/42 | (2006.01) |
| H04M 1/64 | (2006.01) |
| H04M 7/00 | (2006.01) |
| H04H 40/00 | (2008.01) |
| H04B 1/38 | (2006.01) |
| H04B 7/216 | (2006.01) |
| H04N 7/14 | (2006.01) |
| H04N 5/232 | (2006.01) |
| A61B 1/04 | (2006.01) |
| A61B 1/06 | (2006.01) |
| H04W 4/00 | (2009.01) |

(52) U.S. Cl. ................... 455/556.1; 455/3.06; 455/415; 455/566; 348/14.01; 348/69; 348/211.12; 370/329; 370/335; 379/88.19; 379/233

(58) Field of Classification Search .................. 455/3.06, 455/415, 422.1, 556.1, 557, 566, 412.1, 414.1, 455/451, 452.2, 509, 550.1, 552.1, 556.2; 345/581; 348/14.01–14.16, 69, 211.8, 211.12, 348/211.13, 239, 385.1, 423.1, 429.1, 431.1, 348/431.2, 471, 472, 143, 218.1, 333.01–333.05; 379/88.19, 14.2, 200, 232, 233, 234, 236; 375/240.02; 382/103; 370/329, 335, 341, 370/352, 353
See application file for complete search history.

(56) References Cited

U.S. PATENT DOCUMENTS 6,346,964 B1 *    2/2002    Rogers et al. ............ 348/14.11

(Continued)

FOREIGN PATENT DOCUMENTS

JP      03-053783 A      3/1991

(Continued)

OTHER PUBLICATIONS

Japanese Office Action dated Jun. 5, 2007 (and English translation thereof) issued in a counterpart Japanese Application.

(Continued)

Primary Examiner—Andrew Wendell
Assistant Examiner—Paul P Tran
(74) Attorney, Agent, or Firm—Holtz, Holtz, Goodman & Chick, PC

(57) ABSTRACT

A mobile terminal includes a camera configured to obtain first image information, and a receiving unit configured to receive second image information from outside. A display unit is configured to display at least one of a first image and a second image. A display control unit is configured to receive a first request for displaying the first image after the first image information is obtained by the camera, and to receive a second request for displaying the second image after the second image information is received from outside. The display control unit is configured to perform control to update a display on the display unit if the first request or the second request is received, at a predetermined updating time, which occurs at a predetermined interval.

14 Claims, 12 Drawing Sheets

U.S. PATENT DOCUMENTS

| | | | | |
|---|---|---|---|---|
| 6,549,948 | B1 * | 4/2003 | Sasaki et al. | 709/233 |
| 6,665,006 | B1 * | 12/2003 | Taguchi | 348/211.1 |
| 7,145,594 | B2 * | 12/2006 | Seo | 348/14.09 |
| 7,224,999 | B1 * | 5/2007 | Yamaguchi | 455/566 |
| 7,619,634 | B2 * | 11/2009 | Inokuma | 345/581 |

FOREIGN PATENT DOCUMENTS

| | | |
|---|---|---|
| JP | 06-022310 A | 1/1994 |
| JP | 07-175445 A | 7/1995 |
| JP | 08-331533 A | 12/1996 |
| JP | 11-234654 A | 8/1999 |
| JP | 11-242469 A | 9/1999 |
| JP | 2002-112212 A | 4/2002 |
| JP | 2005-286920 A | 10/2005 |
| JP | 2005-311670 A | 11/2005 |
| JP | 2005-333287 A | 12/2005 |
| JP | 2006-005570 A | 1/2006 |

OTHER PUBLICATIONS

Japanese Office Action dated Sep. 9, 2008 (and English translation thereof) issued in a counterpart Japanese Application.

An Explanation of Circumstances Concerning Accelerated Examination filed in a divisional application of Japanese Application JP 2006-332695 (and English translation thereof).

* cited by examiner

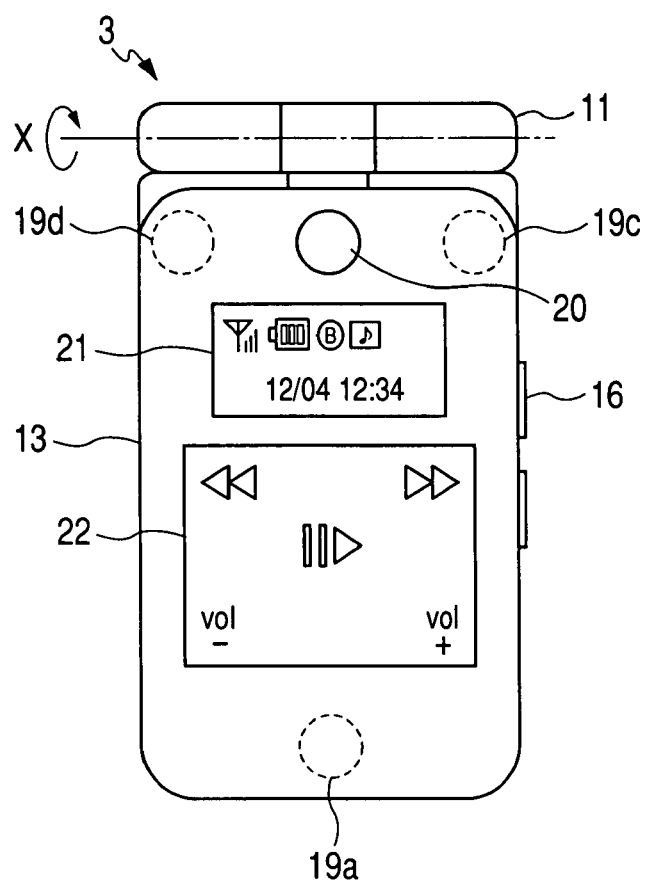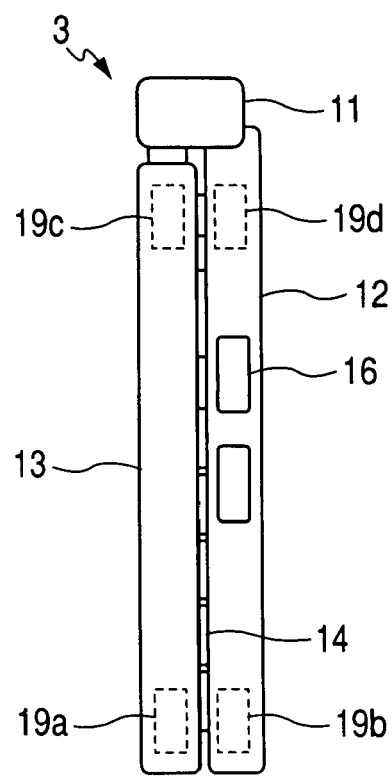
FIG. 3A
FIG. 3B

DISPLAY UPDATE TIMER

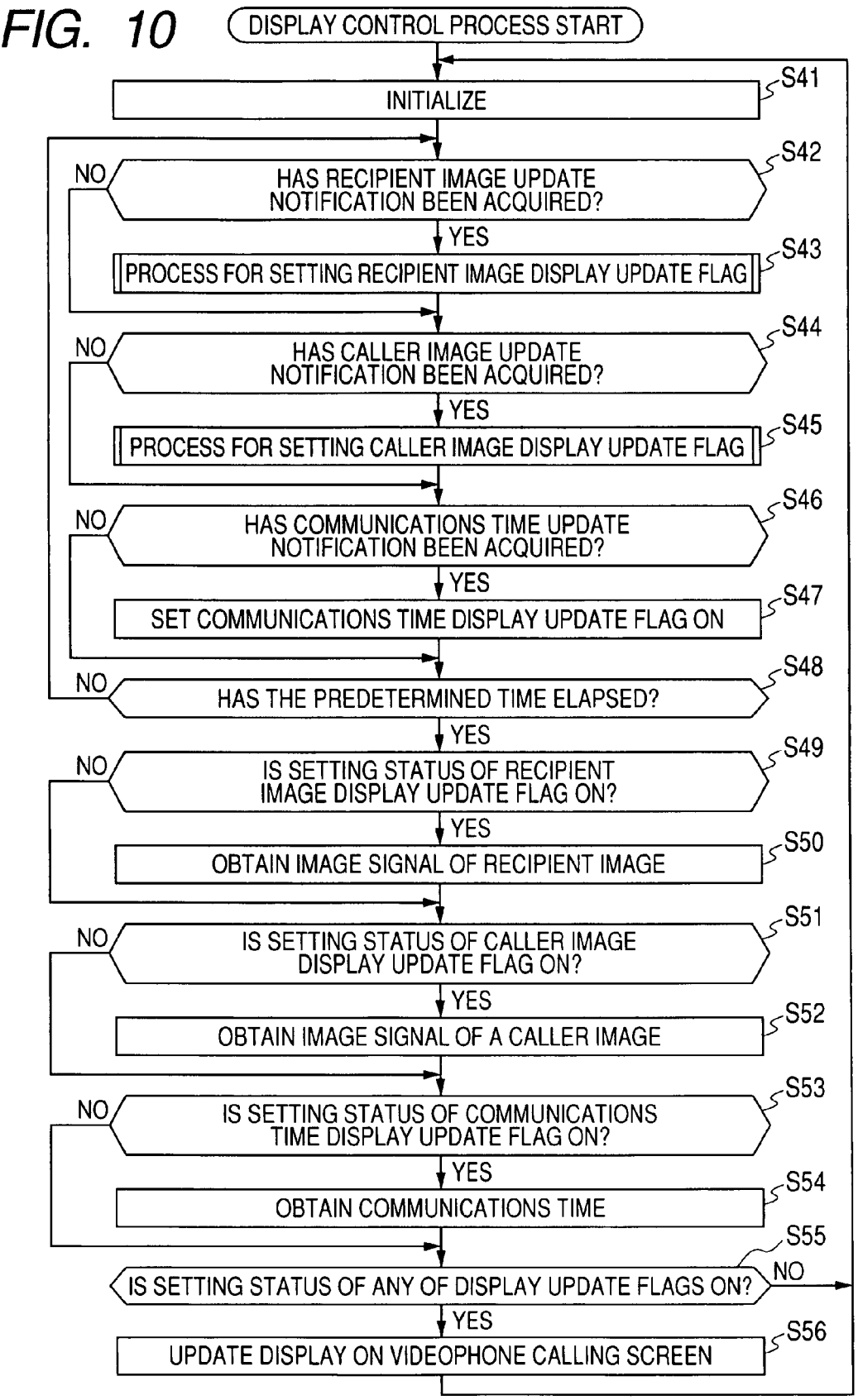

FIG. 11
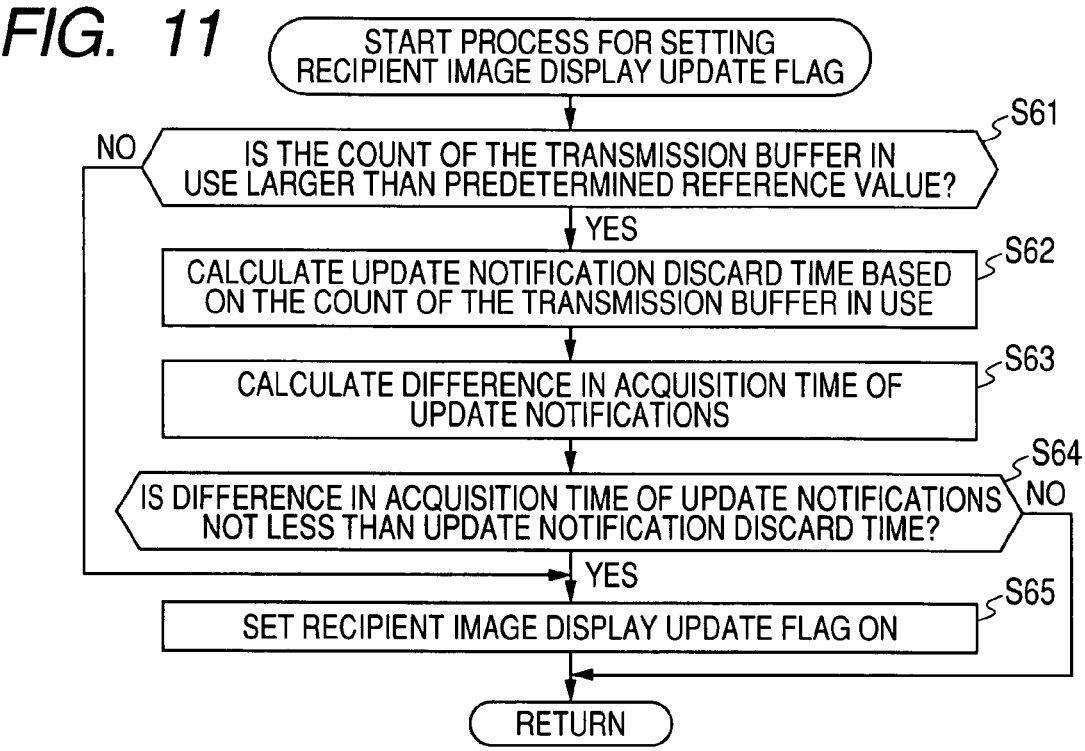
FIG. 12A
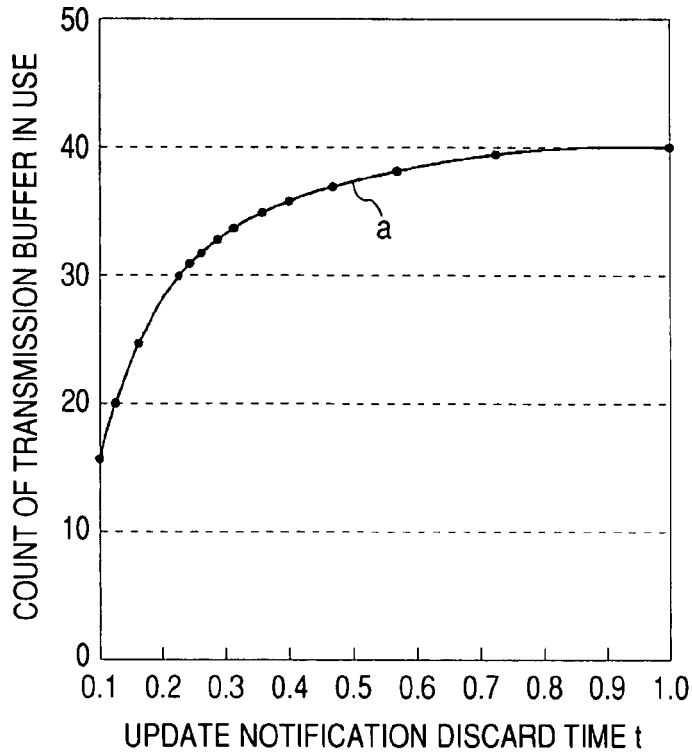
FIG. 12B
| q | t |
|---|---|
| 16 | 0.1 |
| ⋮ | ⋮ |
| 20 | 0.11 |
| ⋮ | ⋮ |
| 25 | 0.15 |
|   |   |
| 30 | 0.21 |
| 31 | 0.23 |
| 32 | 0.25 |
| 33 | 0.28 |
| 34 | 0.31 |
| 35 | 0.35 |
| 36 | 0.40 |
| 37 | 0.47 |
| 38 | 0.57 |
| 39 | 0.73 |
| 40 | 1.00 |

VIDEO MOBILE TERMINAL

CROSS-REFERENCE TO RELATED APPLICATIONS

This application is based on and claims the benefit of priority from the prior Japanese Patent Application No. 2006-256261, filed on Sep. 21, 2006; the entire contents of which are incorporated herein by reference.

BACKGROUND

1. Technical Field

The present invention relates to a mobile terminal with which a videophone call can be made.

2. Description of Related Art

In recent years, with the development of mobile communications systems, transmission rates have been improved both in an up direction from a terminal that executes mobile communication to a base station and in a down direction from a base station to the terminal. More specifically, in a CDMA2000 1xEV-DO Revision A (IS-856-A) system, it is possible to execute communication at a maximum rate of 1.8 Mbps in the up direction and at a maximum rate of 3.1 Mbps in the down direction. This enables larger volumes of data to be transmitted to and received from various communications services.

In a videophone call, for example, a cell-phone, it is possible to transmit and receive: an image encoded at a bit rate of 48 kbps and at a frame rate of 15 fps (the number of frames per second) using a predetermined coding format (e.g., MPEG (Moving Picture Experts Group) 4, H.263, etc.); and voice encoded at a bit rate of 12.2 kbps using a predetermined coding format (e.g., AMR-NB (Adaptive multi-rate Narrowband), etc.).

Further, in response to the support of QoS (Quality of Service), it becomes possible to switch, depending on communication conditions, the quality of providing a videophone call. For example, when the communication conditions are not good since the infrastructure is used with high frequently, a low-bit image can be transmitted and received by encoding the image at a bit rate of 24 kbps and at a frame rate of 7.5 fps.

Additionally, as a technology for making a videophone call using a cell-phone, such a technology has recently been proposed. JP-A-2006-5570 discloses that allows a sender to confirm an image before sending and being displayed on a display section of a cell-phone of a receiver through the videophone According to the technology disclosed in JP-A-2006-5570, a transmission start instruction signal for instructing to start sending an image displayed on a display section is outputted, and according to the transmission start instruction signal thus outputted, start of a videophone call with a call recipient is controlled. This allows the sender to confirm an image to be sent before starting to send the image, thereby preventing the sender from accidentally sending an image that he/she does not want a receiver to view.

SUMMARY

According to an aspect of the invention, there is provided a mobile terminal including: a camera configured to acquire a first image information; a receiving unit configured to receive a second image information from outside; a display unit configured to display at least one of a first image based on the first image information and a second image based on the second image information; a display control unit configured to receive a first request for displaying the first image on the display unit after the first image information is obtained by the camera, and receive a second request for displaying the second image on the display unit after the second image information is received from outside, and the display control unit configured to control to update a display on the display unit, if the first request or the second request is received every predetermined time.

According to another aspect of the invention, there is provided a mobile terminal including: a camera configured to acquire a first image information; a receiving unit configured to receive a second image information from outside; a display unit configured to display, in a videophone call function, a first image based on the first image information and a second image based on the second image information, a first setting unit configured to set a flag of the first image based on the acquisition of the first image information; a second setting unit configured to set a flag of the first image based on the reception of the second image information; a display control section configured to confirm at a predetermined time whether or not at least one of the flag of the first image and the flag of the second image is set and update a display of the display unit based on the set flag if the at least one of the flag of the first image and the flag of the second image is set, and the display control section configured to control not to update the first image and the second image at a timing other than the predetermined time.

BRIEF DESCRIPTION OF THE DRAWINGS

In the accompanying drawings;

FIGS. 3A and 3B are exemplary external views showing another structure of the external appearance of the camera-equipped digital cell-phone according to the embodiment;

FIG. 10 is an exemplary flowchart illustrating another display control process in the camera-equipped digital cell-phone of FIG. 4;

FIG. 11 is an exemplary flowchart illustrating a detailed process for setting a recipient image update display flag in Step 543 of FIG. 10;

FIGS. 12A and 12B are views showing the relationship between a count of the transmission buffer in use and an update notification discard time.

DESCRIPTION OF THE EMBODIMENTS

With reference to the drawings, the following describes an embodiment of the present invention.

Figure 1:
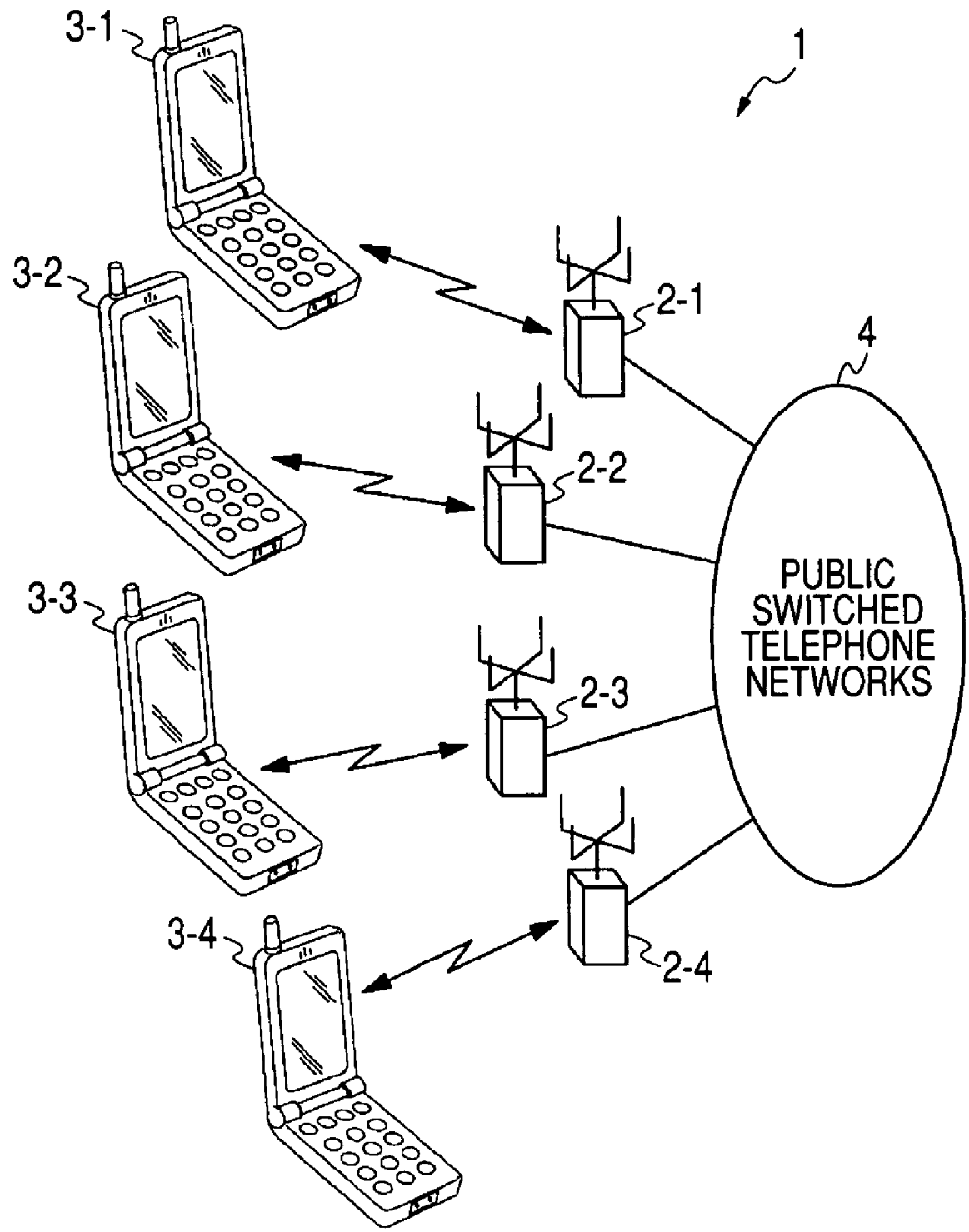
FIG. 1 is an exemplary schematic view showing configuration of a network system according to an embodiment.

FIG. 1 is a view showing a schematic structure of a network system 1 according to the embodiment.

In the network system 1, fixed wireless stations, i.e., base stations 2-1 through 2-4, are provided in cells made by dividing an area where communications services are provided into a desirable size. These base stations 2-1 through 2-4 are wirelessly connected to mobile wireless stations, i.e., camera-equipped digital cell-phones 3-1 through 3-4, in a code division multiple access system, for example, so called W-CDMA (Wideband-Code Division Multiple Access). This enables communication of large data at a high speed, for example, at a maximum data transmission rate of 2 [Mbps] in a frequency band of 2 [GHz].

As such, the camera-equipped digital cell-phones 3-1 through 3-4 enables data communication of a large volume of data at a high speed in the W-CDMA system. This enables various data communications including not only voice communications, but also sending and receiving an e-mail, viewing a simplified homepage, transmitting and receiving an image, and the like.

Further, the base stations 2-1 through 2-4 are connected via wired lines to a public switched telephone networks 4, to which an access server (not shown) of an internet service provider is connected. The access server is connected to a content server (not shown) and the like via networks (e.g., the Internet, LAN (Local Area Network), WAN (Wide Area Network), and a network of other types), which are not shown.

Additionally, hereinafter, the base stations 2-1 through 2-4 are referred to as base stations 2 and the camera-equipped digital cell-phones 3-1 through 3-4 are referred to as camera-equipped digital cell-phones 3 when there is no need to make distinctions among the base stations 2-1 through 2-4 and among the camera-equipped digital cell-phones 3-1 through 3-4, respectively.

Figure 2A:
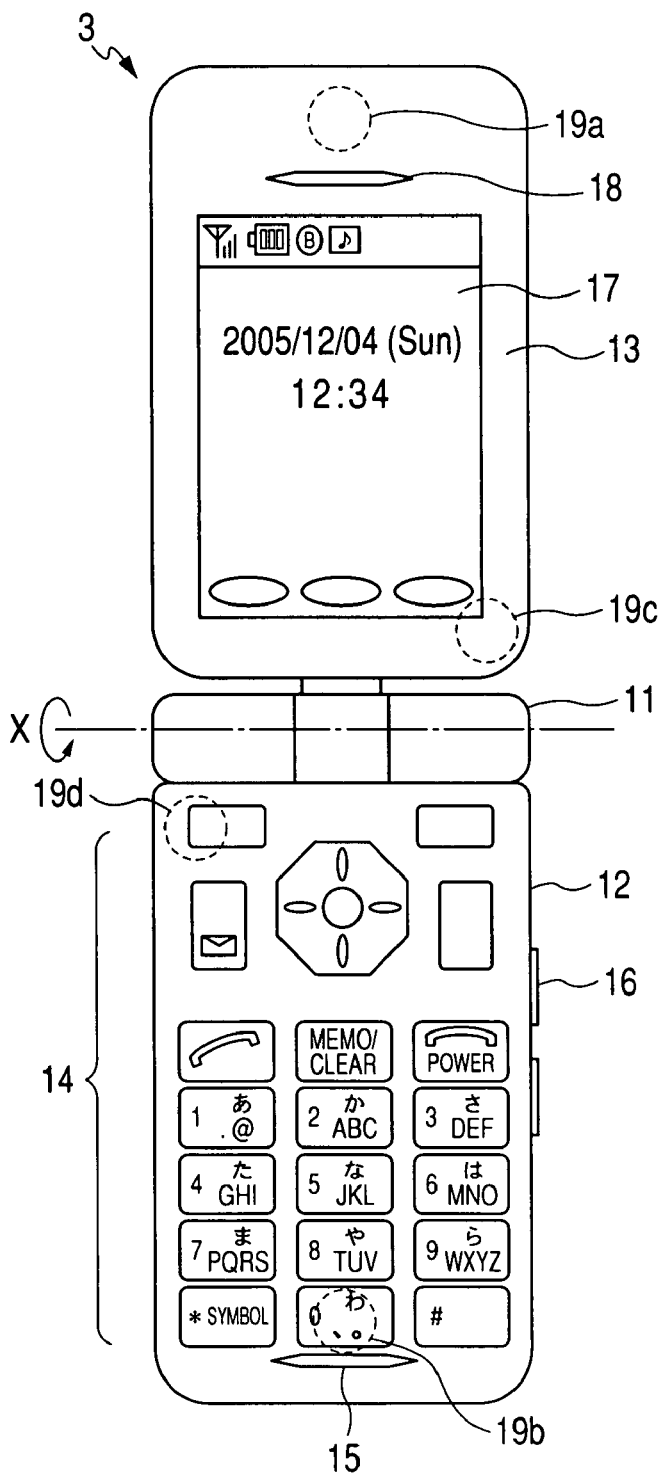
FIGS. 2A and 2B are exemplary external views showing a structure of the external appearance of a camera-equipped digital cell-phone according to the embodiment.
Figure 2B:
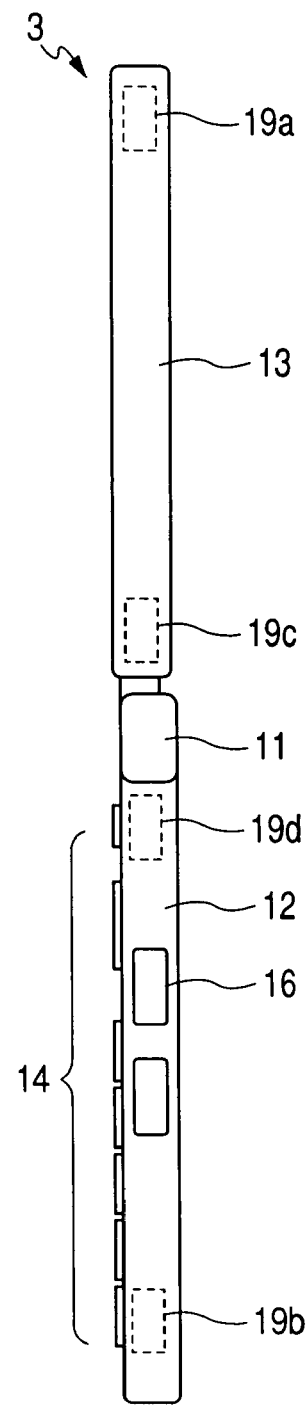

FIG. 2A shows an external appearance of the structure when the camera-equipped digital cell-phone 3 is opened at approximately 180 degrees and viewed from the front. FIG. 2B shows an external appearance of the structure when the camera-equipped digital cell-phone 3 is opened and viewed from the side.

As shown in FIGS. 2A and 2B, the camera-equipped digital cell-phone 3 is formed such that a first housing 12 and a second housing 13 have a hinge joint via a hinge section 11, provided at the center as a border therebetween, so as to be foldable via the hinge section 11 in a direction indicated by an arrow X. The camera-equipped digital cell-phone 3 has a transmitting and receiving antenna (antenna 44 of FIG. 4 described later) provided at a predetermined internal position, so that radio waves can be transmitted to and received from the base stations 2 via the built-in antenna.

The first housing 12 has operating keys 14 on its surface. The operating keys 14 has numeric keys "0" through "9," a call key, a redial key, an call-ending/power key, a clear key, an e-mail key, and the like. Various instructions can be entered by the operation keys 14.

The first housing 12 has a cross key and an enter key both are provided on its top portion. When the user operates the cross key in the up, down, left, and right directions, the placed cursor can be moved to the up, down, left, and right directions. More specifically, various operations such as scrolling the cursor on a telephone book list or e-mail, turning pages of a simplified homepage, and sending an image are executed on the display appearing on a liquid crystal display 17 provided on the second housing 13.

Further, pressing the enter key enables confirmation of various functions. For example, in the first housing 12, by the user's operation of the cross key, a desirable telephone number is selected from among telephone numbers in a telephone book list displayed on the liquid crystal display 17. Further, when the enter key is pressed in the inward direction of the first housing 12, the selected telephone number is confirmed and a process for calling the telephone number is executed.

Further, the first housing 12 has an e-mail key on the left side of the cross key and the enter key. When the e-mail key is pressed in the inward direction of the first housing 12, a function of sending and receiving e-mail is called up. On the right side of the cross key and the enter key is provided a browser key, and pressing the browser key in the inward direction of the first housing 12 allows the user to view data of a Web page. Additionally, the e-mail key and the browser key, respectively provided on the left and right sides of the cross key and the enter key, are allowed to have various functions such as, for example, "Yes" and. "No" functions, depending on a screen appearing on the liquid crystal display 17. Thus, the e-mail key and the browser key are respectively called a soft key 1 and a soft key 2.

The first housing 12 has a microphone 15 provided below the operating keys 14. With the microphone 15, the voice of the user is collected when the user talks on the phone. Further, the first housing 12 has a side key 16 for operating the camera-equipped digital cell-phone 3.

The first housing 12 has a battery pack (not shown) inserted therein from its back side. When the call-ending/power key is in the ON state, power is supplied from the battery back to circuit sections, so that the camera-equipped digital cell-phone 3 is activated to be in an operable state.

The first housing 12 has a memory card slot (not shown), provided at a predetermined lower position of the first housing 12, for inserting and attaching a removable memory card (memory card 46 of FIG. 4 described later). By pressing a memo button (not shown), the voice of a call recipient during a call can be recorded in the memory card. Further, an e-mail, a simplified homepage, and an image taken by a CCD camera can also be recorded in the memory card corresponding to operations by a user.

The memory card as used herein is one type of flash memory card represented by flash memory cards of NAND type, flash memory cards of NOR type, and the like. The memory card contains, in a small thin plastic case, a flash memory element that is an electrically rewritable and erasable non-volatile memory. Further, the memory card is capable of writing thereto and reading out therefrom various data via 10 pin terminals, such as images, voice, and music data.

The memory card employs a unique serial protocol that ensures compatibility with apparatuses in use even when the specification of the built-in flash memory is changed due to a significant increase in data volume, thereby realizing a high-speed performance. Further, the memory card ensures high reliability with a write protect switch.

Since the camera-equipped digital cell-phone 3 includes such a removable memory card, it can share data with other electronic apparatuses via the memory card.

Further, the camera-equipped digital cell-phone 3 can have further expanded functions by containing a module (chip) for expanding a predetermined function into the memory card and then by attaching the module to the memory card slot (not shown).

For example, even in a case where no non-contact IC chip is built in, by attaching a memory card with an embedded non-contact IC (Integrated Circuit) chip, the camera-equipped digital cell-phone 3 is allowed to have expanded functions to execute an electronic payment function, as in the case where a non-contact IC chip is built in.

Furthermore, the second housing 13 has the liquid crystal display 17 (main display) provided on its front side. On the liquid crystal display 17, conditions of receiving radio waves, an amount of remaining battery, information registered in a telephone book, such as names and telephone numbers of call recipient's name, histories of sending mails to them, contents of an e-mail, a simplified homepage, an image taken-by a CCD (Charge Coupled Device) camera (CCD camera 20 of FIGS. 3A, 3B described later), content received from an external content server (not shown), and/or content stored in a memory card (memory card 46 of FIGS. 2A, 2B described later) are displayed. Further, on a predetermined position above the liquid crystal display section 17 is provided a speaker 18, with which the user can execute voice communications.

Further, in predetermined positions inside the first housing 12 and the second housing 13 are provided magnetic sensors 19a, 19b, 19c, and 19d for detecting conditions of the camera-equipped digital cell-phone 3.

The state of the camera-equipped digital cell-phone 3 shown in FIGS. 3A, 3B is realized by rotationally moving it from the state of the camera-equipped digital cell-phone 3 shown in FIG. 2 in the direction indicated by the arrow X. FIG. 3A shows an external appearance of the camera-equipped digital cell-phone 3 when it is closed and viewed from the front. FIG. 3B shows an external appearance of the camera-equipped digital cell-phone 3 when it is closed and viewed from the side.

On the upper portion of the second housing 13 is provided the CCD camera 20, with which an image of a desirable object can be taken. Below the CCD camera 20 is provided a sub display 21, antenna pict indicating a current sensitivity level of an antenna, battery pict indicating a current amount of remaining battery of the camera-equipped digital cell-phone 3, and the present time, etc. are displayed.

Below the sub display 21 is further provided an electro-static touch pad 22. Although the electrostatic touch panel 22 appears to be a single touch pad, it includes sensors (not shown) provided at a plurality of locations. When the user touches around the sensors, they detect it and execute a rewinding or fast-forwarding function, or operations such as decreasing or increasing the volume, reproducing, and pausing.

Figure 4:
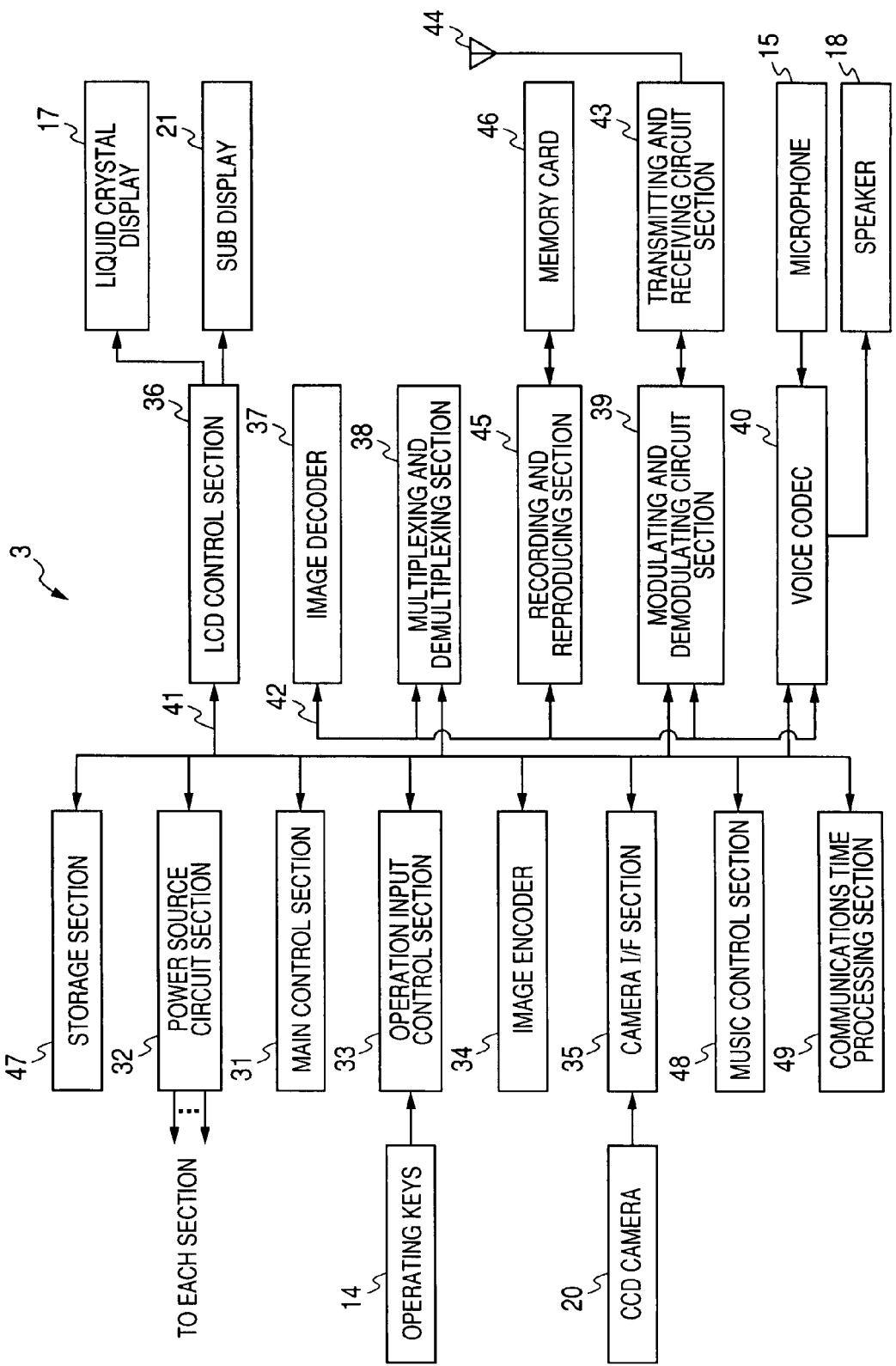
FIG. 4 is an exemplary block diagram showing an internal structure of a camera-equipped digital cell-phone according to the embodiment.

As shown in FIG. 4, in the camera-equipped digital cell-phone 3, a main control section 31 which centrally controls each section of the first housing 12 and the second housing 13 is connected via a main bus 41 to a power circuit section 32, an operation input control section 33, an image encoder 34, a camera interface section 35, an LCD (Liquid Crystal Display) control section 36, a multiplexing and demultiplexing section 38, a modulating and demodulating circuit section 39, a voice codec 40, a storage section 47, and a music control section 48. Further, the image encoder 34, an image decoder 37, the multiplexing and demultiplexing section 38, the modulating and demodulating circuit section 39, the voice codec 40, and a recording and reproducing section 45 are connected to one another via a synchronous bus 42.

The power circuit section 32 supplies power from the battery pack to each section when the call-ending/power key is in the ON state corresponding to operations by a user, so as to activate the camera-equipped digital cell-phone 3 to be in an operable state.

The main control section 31 includes a CPU (Central Processing Unit), a ROM (Read Only Memory), a RAM (Random Access Memory), and the like. The CPU executes various processes, in accordance with programs stored in the ROM or various application programs loaded from the storage section 47 to the RAM. The CPU also generates various control signals and supplies them to each section, thereby centrally controlling the camera-equipped digital cell-phone 3. The RAM appropriately stores data that is necessary for the CPU to execute the various processes.

Additionally, the main control section 31 incorporates a timer for measuring the present date and time accurately.

The various application programs to be executed by the CPU can be installed to the ROM and/or the storage section 45 beforehand. Further, the various application programs to be executed by the CPU can be installed to the storage section 47 by executing communication via the base stations 2 and downloading them to the camera-equipped digital cell-phone 3. Further, the various application programs executed by the CPU can also be installed to the storage section 47 by recording them in the memory card 46 beforehand and read them out with the recording and reproducing section 45.

In the camera-equipped digital cell-phone 3, under the control of the main control section 31, voice signals collected via the microphone 15 in a voice communication mode are converted and compressed into digital voice signals at the voice codec 40. Further, the digital voice signals are subjected to a spread spectrum modulation process at the modulating and demodulating circuit section 39, subjected to a digital-to-analog conversion process and a frequency conversion process at the transmitting and receiving circuit section 43, and then transmitted via the antenna 44.

Further, in the camera-equipped digital cell-phone 3, received signals received at the antenna 44 in the voice communication mode are amplified and subjected to the frequency conversion process and an analog-to-digital conversion process. The signals are further subjected to a spread spectrum demodulation process at the modulating and demodulating circuit section 39, expanded at the voice codec 40, and converted to analog voice signals. The analog voice signals thus converted are then outputted via the speaker 18.

Further, when the camera-equipped digital cell-phone 3 sends an e-mail in a data communication mode, text data of the e-mail inputted by operating the operating keys 14 is transmitted to the main control section 31 via the operation input control section 33. Under the control of the main control section 31, the text data is subjected to the spread spectrum modulation process at the modulating and demodulating circuit section 39, subjected to the digital-to-analog conversion process and the frequency conversion process at the transmitting and receiving circuit section 43, and then transmitted to the base stations 2 via the antenna 44.

Furthermore, when the camera-equipped digital cell-phone 3 receives an e-mail in the data communication mode, received signals received from the base stations 2 via the antenna 44 are subjected to the spread spectrum demodulation process at the modulating and demodulating circuit section 39 so that the original text data is restored. The signals are displayed as an e-mail on the liquid crystal display 17 via the LCD control section 36.

Thereafter, in the camera-equipped digital cell-phone 3, the e-mail received corresponding to operations by a user may be recorded in the memory card 46 via the recording and reproducing section 45.

When the camera-equipped digital cell-phone 3 transmits no image signal, an image signal taken by the CCD camera 20 is directly displayed on the liquid crystal display 17 via the camera interface section 45 and the LCD control section 46.

When the camera-equipped digital cell-phone 3 transmits an image signal in the data communication mode, an image signal taken by the CCD camera 20 is supplied to the image encoder 34 via the camera interface section 35.

The image encoder 34 compresses and encodes, using a predetermined coding format such as, for example, MPEG (Moving Picture Experts Group) 4, the image signal thus supplied from the CCD camera 20 and thereby converts it to an encoded image signal. The encoded image signal thus converted is transmitted to the multiplexing and demultiplexing section 38. At the same time, in the camera-equipped cell-phone 3, voice collected via the microphone 15 while the image is taken by the CCD camera 20 is transmitted as a digital voice signal to the multiplexing and demultiplexing section 38 via the voice codec 40.

The multiplexing and demultiplexing section 38 multiplexes, using a predetermined format, the encoded image signal supplied from the image encoder 34 and the voice signal supplied from the voice codec 40. As a result, a multiplexed signal is obtained, and is subjected to the spread spectrum modulation process at the modulating and demodulating circuit section 39, subjected to the digital-to-analog conversion process and the frequency conversion process at the transmitting and receiving circuit section 43, and then transmitted via the antenna 44.

Furthermore, the camera-equipped digital cell-phone 3 can receive data of a Web page in the data communication mode.

That is, in the data communication mode, when the camera-equipped digital cell-phone 3 transmits data that requires, for example, a Web page, as a response to a request, data of the Web page is transmitted via the base stations 2. The data of the Web page is received at the transmitting and receiving circuit section 43 and the modulating and demodulating circuit section 39 via the antenna 44. The transmitting and receiving circuit section 43 and the modulating and demodulating circuit section 39 then transmit the received data of the Web page to the main control section 31.

The main control section 31 interprets the data of the Web page, and generates an image (picture) based on the interpretation. The image thus generated is supplied from the main control section 31 to the liquid crystal display 17 via the LCD control section 36 and displayed. That is, at least an application program of a Web browser has been installed in the ROM or the storage section 47 of the main control section 31, and the CPU of the main control section 31 functions as the Web browser by executing the application program of the Web browser on the RAM, and executes operations such as interpreting the data of the Web page.

Further, in the data communication mode, when the camera-equipped digital cell-phone 3 receives data of a moving image file that is linked to, for example, a Web page, etc., received signals received from the base stations 2 via the antenna 44 are subjected to the spread spectrum demodulation process at the modulating and demodulating circuit section 39, and the multiplexed signal thus obtained is transmitted to the multiplexing and demultiplexing section 38.

The multiplexing and demultiplexing section 38 separates the multiplexed signal into an encoded image signal and a voice signal, so as to supply via the synchronous bus 42 the encoded image signal and the voice signal to the image decoder 37 and simultaneously supply to the voice codec 40, respectively. The image decoder 37 decodes the encoded image signal using a decoding format that supports a predetermined encoding format such as MPEG 4, so as to generate a reproducing moving image signal and supply it to the liquid crystal display 17 via the LCD control section 36. In this way, moving image data contained in, for example, a moving image file linked to a Web page, etc., is displayed.

At the same time, the voice codec 40 converts the voice signal into an analog voice signal and supplies it to the speaker 18. In this way, the voice signal contained in, for example, a moving image file linked to a Web page, etc., is reproduced. In this case also, as in the case of an e-mail, in the camera-equipped digital cell-phone 3, the received data linked to the Web page, etc., can be recorded in the memory card 46 via the recording and reproducing section 45 corresponding to operations by the user.

The storage section 47 includes, for example, a flash memory element that is an electrically rewritable and erasable non-volatile memory, and the like. The storage section 47 stores various application programs to be executed by the CPU of the main control section 31, and/or various sets of data. Further, the storage section 47 stores, when needed, moving image data and other information contained in an e-mail received corresponding to operations by a user or in a moving image file linked to a received Web page, etc.

The music control section 48 controls operations executed on voice data stored in the storage section 47, such as a reproducing or pausing operation, a rewinding or fast-forwarding function, and decreasing or increasing the volume.

The communications time processing section 49 includes a display update timer (not shown) and the like, and manages a communications time of a videophone call executed among a plurality of camera-equipped digital cell-phones 3.

Figure 5:
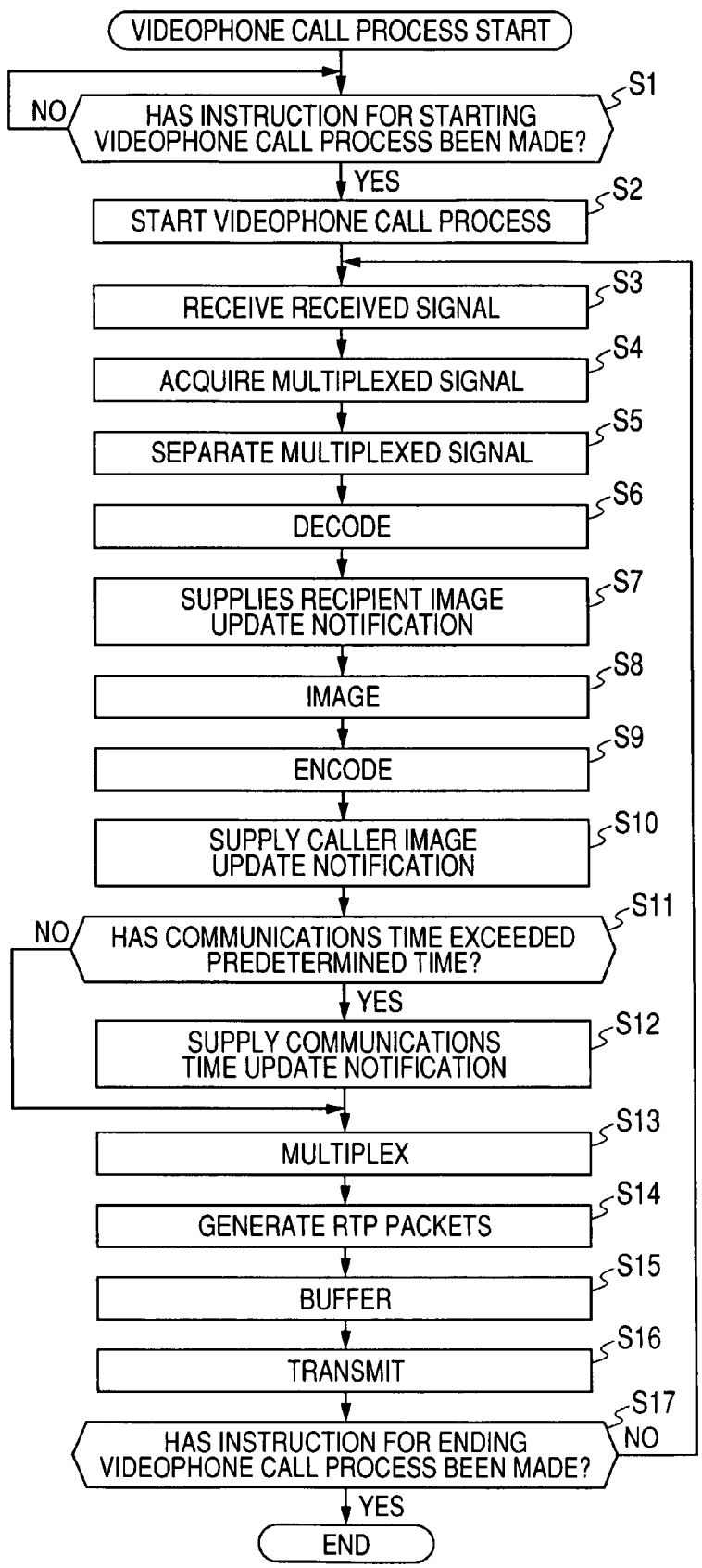
FIG. 5 is an exemplary flowchart illustrating a videophone call process in the camera-equipped digital cell-phone of FIG. 4.

Referring now to FIG. 5, a description is made for a videophone call process in the camera-equipped digital cell-phone 3 of FIG. 4. The videophone call process is started when an instruction for starting the videophone call process is made by the operation of the operating keys 14 by the user. Additionally, a display control process (writing process) executed on the liquid crystal display 17 by the LCD control section 36 of the camera-equipped digital cell-phone 3 will be described later, with reference to a flowchart of FIG. 7.

In Step S1, the main control section 31 determines whether an instruction for starting the videophone call process is made by the operation of the operating key 14 by the user, and waits until it determines that the instruction for starting the videophone call process is made by the operation of the operating keys 14 by the user.

If it is determined in Step S1 that the instruction for starting the videophone call process has been made by the operation of the operating keys 14 by the user, in Step S2, the main control section 31 starts to execute the videophone call process with another camera-equipped digital cell-phone 3 possessed by another user.

In Step S3, in accordance with the control of the main control section 31, the transmitting and receiving circuit section 43 receives via the antenna 44 received signals from another camera-equipped digital cell-phone 3 via the base stations 2. The transmitting and receiving circuit section 43 then subjects the received signals thus received to the digital-to-analog conversion process and the frequency conversion process, and supplies the received signals thus processed to the modulating and demodulating circuit section 39.

In Step S4, in accordance with the control of the main control section 31, the modulating and demodulating circuit section 39 subjects the received signals, supplied from the transmitting and receiving circuit section 43 and having undergone the digital-to-analog conversion process and the frequency conversion process, to the spread spectrum demodulation process. As a result, a multiplexed signal is acquired and the thus acquired multiplexed signal is supplied to the multiplexing and demultiplexing section 38.

In Step S5, in accordance with the control of the main control section 31, the multiplexing and demultiplexing section 38 separates the multiplexed signal, supplied from the modulating and demodulating circuit section 39, into an encoded image signal and a voice signal of another user (call recipient). The multiplexing and demultiplexing section 38 then supplies via the synchronous bus 42 the encoded image signal of another user (call recipient) and the voice signal of another user (call recipient) to the image decoder 37 and the voice codec 40, respectively.

In Step S6, in accordance with the control of the main control section 31, the image decoder 37 decodes, using a decoding format that supports a predetermined encoding format such as, for example, MPEG4 or H.263, the encoded image signal of another user (call recipient). In this way, the image decoder 37 generates a reproducing moving image signal of another user (call recipient), and retains the reproducing moving image signal thus generated.

Additionally, the reproducing moving image signal retained in the image decoder 37 is supplied to the LCD control section 36 in Step S30 of FIG. 7 described later (i.e., the LCD control section 36 acquires the retained reproducing moving image signal). In the case where an encoded image signal to be displayed next is decoded and a new reproducing moving image signal is generated before the retained reproducing moving image signal is supplied to the LCD control section 36 in Step 30, the currently retained reproducing moving image signal is discarded and the new reproducing moving image signal thus generated is retained.

At the same time, in accordance with the control of the main control section 31, the voice codec 40 converts the voice signal (digital voice signal) of another user (call recipient) to an analog voice signal, and then supplies the analog voice signal thus converted to the speaker 18.

In Step S7, upon completion of decoding the encoded image signal of another user (call recipient) to the reproducing moving image signal in the decoding process in Step S6, the image decoder 37 provides the LCD control section 36 with a recipient image update notification indicating that a recipient image, i.e., image of another user (call recipient), has been updated.

In Step S8, in accordance with the control of the main control section 31, the CCD camera 20 takes an image of the user as the subject at a predetermined time, and supplies a moving image signal (reproducing moving image signal) of the taken image of the user (subject) to the image encoder 34 via the camera interface section 35. Additionally, the user who possesses the camera-equipped digital cell-phone 3 is defined as a "subject." Further, the reproducing moving image signal supplied to the image encoder 34 is passed through the image encoder 34 and supplied to the LCD control section 36 in Step S32 of FIG. 7 described later (i.e., the LCD control section 36 acquires via the image encoder 34 the reproducing and moving image signal of the user (subject) taken by the CCD camera 20).

In Step S9, in accordance with the control of the main control section 31, the image encoder 34 retains the moving image signal of the user (subject) supplied from the CCD camera 20, so as to carry out display on the liquid crystal display 17 (indeed, the signal may be once encoded and then retained). At the same time, the image encoder 34 compresses and encodes the moving image signal using a predetermined encoding format such as, for example, MPEG (Moving Picture Experts Group) 4, so as to convert it to an encoded image signal, and then transmits the converted encoded image signal of the user (subject) to the multiplexing and demultiplexing section 38. At the same time, in the camera-equipped digital cell-phone 3, the voice collected via the microphone 15 while the image is taken by the CCD camera 20 is transmitted as a digital voice signal to the multiplexing and demultiplexing section 38 via the voice codec 40.

In Step S10, upon completion of encoding the moving image signal of the user (subject) to the encoded image signal in the encoding process in Step S9, the image encoder 34 supplies a caller image update notification indicating that a caller image as a user self image has been updated to the LCD control section 36.

In Step S11, in accordance with the control of the main control section 31, the communications time processing section 49 determines, using a display update timer (not shown), etc., whether the communications time of the videophone call further exceeds a predetermined time (e.g., for 1 second, etc.).

If it is determined in Step S11 that the communications time of the videophone call further exceeds a predetermined time communications time (e.g., for 1 second, etc.), in Step S12, in accordance with the control of the main control section 31, the communications time processing section 49 supplies a communications time update notification indicating that the communications time of the videophone call has been updated to the LCD control section 36. Additionally, the data of the communications time to be updated is supplied to the LCD control section 36 in Step S34 of FIG. 7 described later.

In Step S13, in accordance with the control of the main control section 31, the multiplexing and demultiplexing section 38 multiplexes, using a predetermined format, the encoded image signal of the user (subject) supplied from the image encoder 34, and the voice signal of the user supplied from the voice codec 40.

In Step S14, the main control section 31 separates the multiplexed signal thus obtained into a predetermined size, so as to generate PTP (Real time Transport Protocol) packets in which the separated multiplexed signals are stored. In Step S15, the main control section 31 successively buffers the RTP packets thus generated to a transmission buffer (not shown).

In Step S16, the main control section 31 successively reads out the RTP packets being buffered into the transmission buffer (not shown), so as to supply them to the modulating and demodulating circuit section 39. In accordance with the control of the main control section 31, the modulating and demodulating circuit section 39 subjects the RTP packets thus successively supplied to the spread spectrum modulation process, and supplies the RTP packets having undergone the spread spectrum modulation process to the transmitting and receiving circuit section 43. In accordance with the control of the main control section 31, the transmitting and receiving circuit section 43 subjects the RTP packets, supplied from the modulating and demodulating circuit section 39 and having undergone the spread spectrum modulation process, to the digital-to-analog conversion process and the frequency conversion process, and then transmits these packets to the base stations 2 via the antenna 44.

In Step S17, the main control section 31 determines whether an instruction for ending the videophone call process is made by the operation of the operating keys 14 by the user.

If it is determined in Step S17 that the instruction for ending the videophone call process has not been made, the process returns to Step S3 and the steps subsequent to Step S3 are repeated. This allows the user to execute the videophone call process with another user desired by the user (videophone call recipient) until the instruction for ending the videophone call process is made by the user.

Furthermore, if it is determined in Step S17 that the instruction for ending the videophone call has been made, the videophone call process is ended.

Additionally, in Steps S7, S10, and S12 of FIG. 5, the update notifications (recipient image update notification, caller image update notification, and communications time update notification) are sequentially supplied to the LCD control section 36. In accordance with these update notifications, the LCD control section 36 executes the display control process (display control process of FIG. 7 described later) with regard to images to be displayed on the liquid crystal display 17 during the videophone call, based on the reproducing moving image signal decoded in Step S6 (reproducing moving image signal that is decoded and then retained); the moving image signal of the user (subject), retained in Step S9 and then supplied from the image encoder 34; and the data of the communications time, retained in Step S12.

Thus, in accordance with the control of the LCD control section 36, with the liquid crystal display 17, an image based on two moving image signals thus acquired appears on a videophone calling screen, at the same time, the communications time of the videophone call appears on a videophone calling screen.

Figure 6:
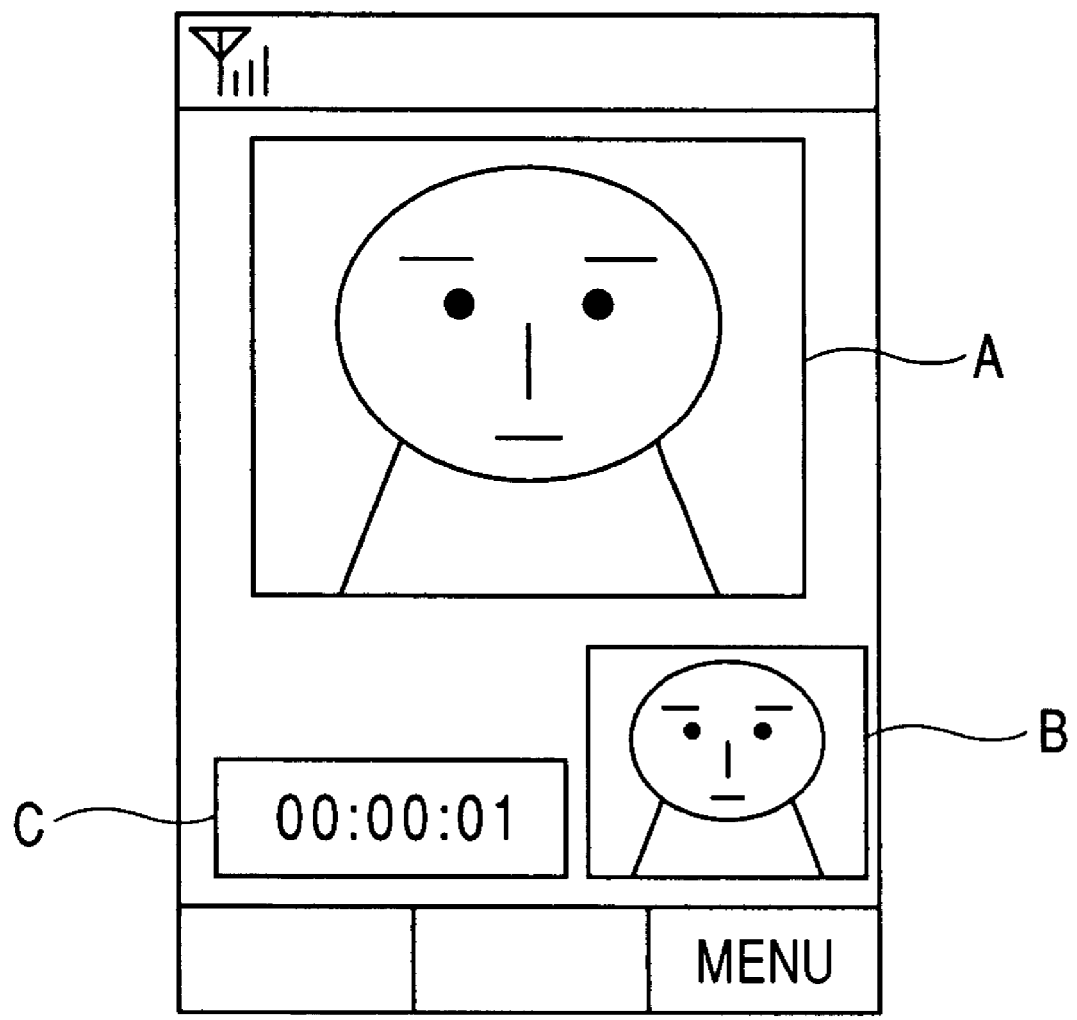
FIG. 6 is an exemplary view showing a display on the videophone calling screen appearing on a liquid crystal display of FIG. 4.

For example, as shown in a videophone calling screen of FIG. 6, a recipient image, i.e., image of another user (call recipient), received from another camera-equipped digital cell-phone 3 via the base stations 2 is displayed in display area A; a caller image as a user self image is displayed in display area B; and a communications time of a videophone call is displayed in display area C. With reference to a flowchart of FIG. 7, the following describes a display control process which is executed during a videophone call by the LCD control section 36 of the camera-equipped digital cell-phone of FIG. 4, and which is executed in parallel with the videophone call process described with reference to the flowchart of FIG. 5.

In Step S21, the main control section 31 controls the LCD control section 36 to initialize setting. That is, the control section 31 controls the LCD control section 36 to set OFF for: a recipient image display update flag indicating whether to update the display of the recipient image; a caller image display update flag indicating whether to update the display of the caller image; and a communications time display update flag indicating whether to update the display of the communications time. In accordance with the control of the main control section 31, the LCD control section 36 sets OFF for: the recipient image display update flag indicating whether to update the display of the recipient image; the caller image display update flag indicating whether to update the display of the caller image; and the communications time display update flag indicating whether to update the display of the communications time.

In Step S22, the LCD control section 36 determines whether the recipient image update notification (i.e., recipient image update notification indicating that the recipient image, i.e., image of another user (call recipient), has been updated) supplied from the image decoder 37 has been acquired.

If it is determined in Step S22 that the recipient image update notification supplied from the image decoder 37 has been acquired, in Step S23, in accordance with the control of the main control section 31, the LCD control section 36 sets ON the recipient image display update flag indicating whether to update the display of the recipient image (i.e., image of another user as a call recipient).

If it is determined in Step S22 that the recipient image update notification supplied from the image decoder 37 has not been acquired, the process in Step S23 is skipped. That is, the recipient image display update flag indicating whether to update the display of the recipient image (i.e., image of another user as a call recipient) is maintained as is to be set OFF.

In Step S24, the LCD control section 36 determines whether the caller image update notification (caller image update notification indicating that a caller image as a user self image has been updated) supplied from the image encoder 34 has been acquired.

If it is determined in Step S24 that the caller image update notification supplied from the image encoder 34 has been acquired, in Step S25, in accordance with the control of the main control section 31, the LCD control section 36 sets ON the recipient image display update flag indicating whether to update the display of a caller image (user self image).

If it is determined in Step S24 that the caller image update notification supplied from the image encoder 34 has not been acquired, the process in Step S25 is skipped. That is, the caller image display update flag indicating whether to update a caller image (user self image) is maintained as is to be set OFF.

In Step S26, the LCD control section 36 determines whether the communications time update notification (communications time update notification indicating that the communications time of the videophone call has been updated) supplied from the communications time processing section 49 has been acquired.

If it is determined in Step S26 that the communications time update notification supplied from the communications time processing section 49 has been acquired, in Step S27, in accordance with the control of the main control section 31, the LCD control section 36 sets ON the communications time display update flag indicating whether to update the display of the communications time of the videophone call.

If it is determined in Step S26 that the communications time update notification supplied from the communications time processing section 49 has not been acquired, the process in Step S27 is skipped. That is, the communications time display update flag indicating whether to update the display of the communications time of the videophone call is maintained as is to be set OFF.

In Step S28, the main control section 31 determines, using the built-in display update timer, whether a predetermined time (e.g., 1/15 second (approximately 66 milliseconds), etc.) has passed since the most recent update of the display.

If it is determined in Step S28 that a predetermined time (1/15 second (approximately 66 milliseconds), etc.) has not elapsed since the most recent update of the display, the process returns to Step S22 and the steps subsequent to Step S22 are repeated. This allows the recipient image update notification, the caller image update notification, and the communications time update notification to be successively acquired and their respective display update flags to be set ON appropriately, until a predetermined time (1/15 second (approximately 66 milliseconds), etc.) passes since the most recent update of the display.

If it is determined in Step S28 that a predetermined time (1/15 second (approximately 66 milliseconds), etc.) has elapsed since the most recent update of the display, in. Step S29, in accordance with the control of the main control section 31, the LCD control section 36 determines whether the recipient image display update flag is set in the ON state.

If the LCD control section 36 determines in Step S29 that the recipient image display update flag is set in the ON state, in Step S30, in accordance with the control of the main control section 31, the LCD-control section 36 acquires the reproducing moving image signal of another user (call recipient), supplied from the image decoder 37.

If the LCD control section 36 determines in Step S29 that the recipient image display update flag is not set in the ON state (i.e., if the LCD control section 36 determines that the recipient image display update flag is set in the OFF state), the process in Step S30 is skipped.

In Step S31, the LCD control section 36 determines whether the caller image display update flag is set in the ON state.

If the LCD control section 36 determines in Step S31 that the caller image display update flag is set in the ON state, in Step S32, in accordance with the control of the main control section 31, the LCD control section 36 acquires the reproducing moving image signal of the user (subject), supplied from the image encoder 34.

If the LCD control section 36 determines in Step S31 that the caller image display update flag is not set in the ON state (i.e., if the LCD control section 36 determines that the caller image display update flag is set in the OFF state), the process in Step S32 is skipped.

In Step S33, the LCD control section 36 determines whether the communications time display update flag is set in the ON state.

If the LCD control section 36 determines in Step S33 that the communications time display update flag is set in the ON state, in Step S34, in accordance with the control of the main control section 31, the LCD control section 36 obtains the data of the communications time to be updated, supplied from the communications time processing section 49.

If the LCD control section 36 determines in Step S33 that the communications time display update flag is not set in the ON state (i.e., if the LCD control section 36 determines that the communications time display update flag is set in the OFF state), the process in Step S34 is skipped.

In Step S35, the LCD control section 36 determines whether any one of the recipient image display update flag, the caller image display update flag, and the communications time display update flag is set in the ON state.

If it is determined in Step S35 that any one of the display update flags is set in the ON state, in Step S36, the LCD control section 36 updates the display on the videophone calling screen apprearing on the liquid crystal display 17, based on at least one of the reproducing moving image signal of another user (call recipient), the reproducing moving image signal of the user (subject), and the data of the communications time to be updated, which are obtained in Steps S29 through S34 according to the determinations that the display update flags are set in the ON state.

In accordance with the control of the LCD control section 36, with the liquid crystal display 17, the display on the videophone calling screen based on at least one of the reproducing moving image signal of another user (call recipient), the reproducing moving image signal of the user (subject), and the data of the communications time to be updated are updated. More specifically, from among the reproducing moving image signal of another user (call recipient), the reproducing moving image signal of the user (subject), and the data of the communications time to be updated, when, for example, the reproducing moving image signal of another user (call recipient) and the reproducing moving image signal of the user (subject) are obtained, the display on the videophone calling screen is updated based on the reproducing moving image signal of another user (call recipient) and the reproducing moving image signal of the user (subject).

Thereafter, the process proceeds to Step 521, and the steps subsequent to Step S21 are executed.

In the process in Step S21, the recipient image display update flag, the caller image display update flag, and the communications time display update flag are reset to be initialized (to be set OFF), their respective display update flags are set ON based on the update notification successively acquired, and the display update process is executed.

If it is determined in Step S35 that none of the display update flags are set in the ON state, the process returns to Step S21, and then the steps subsequent to Step S21 are repeated.

Figure 7:
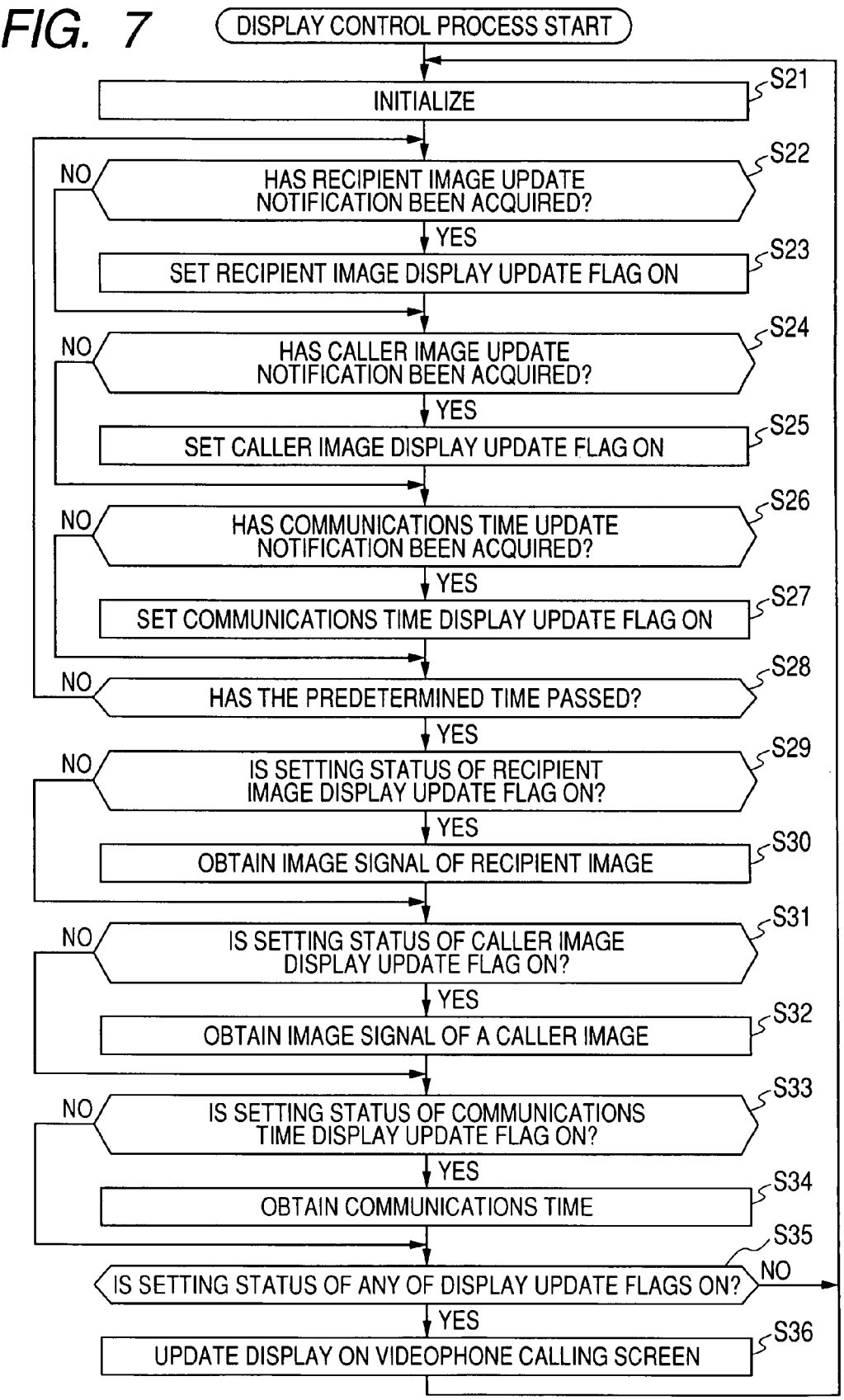
FIG. 7 is an exemplary flowchart illustrating a display control process in the camera-equipped digital cell-phone of FIG. 4.
Figure 8A:
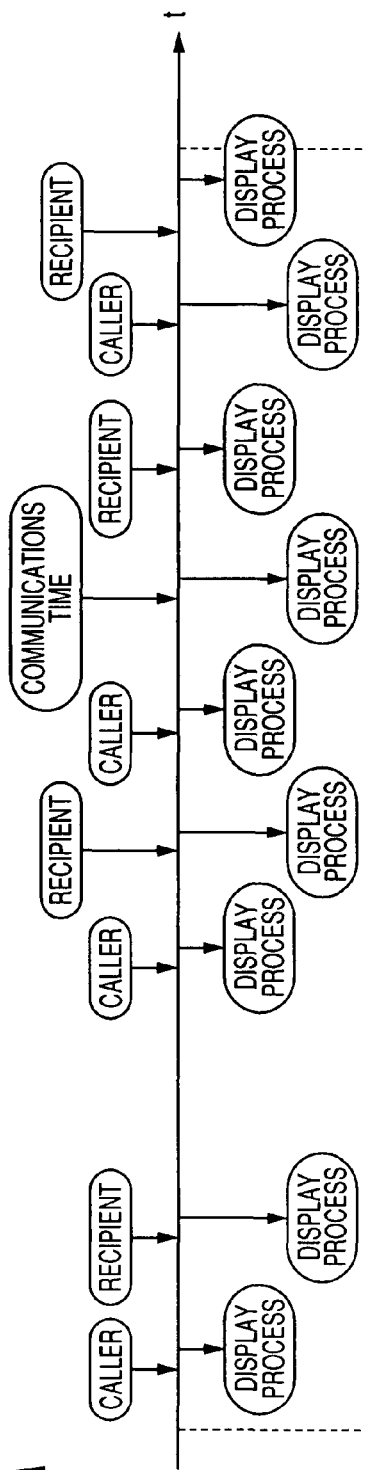
FIGS. 8A and 8B are views showing timing charts indicating: update times of a caller image, a recipient image, and a communications time; and display processes for the images, with regard to a case where the display control process, described with reference to the flowchart of FIG. 7, is not executed and a case where the display control process is executed.
Figure 8B:
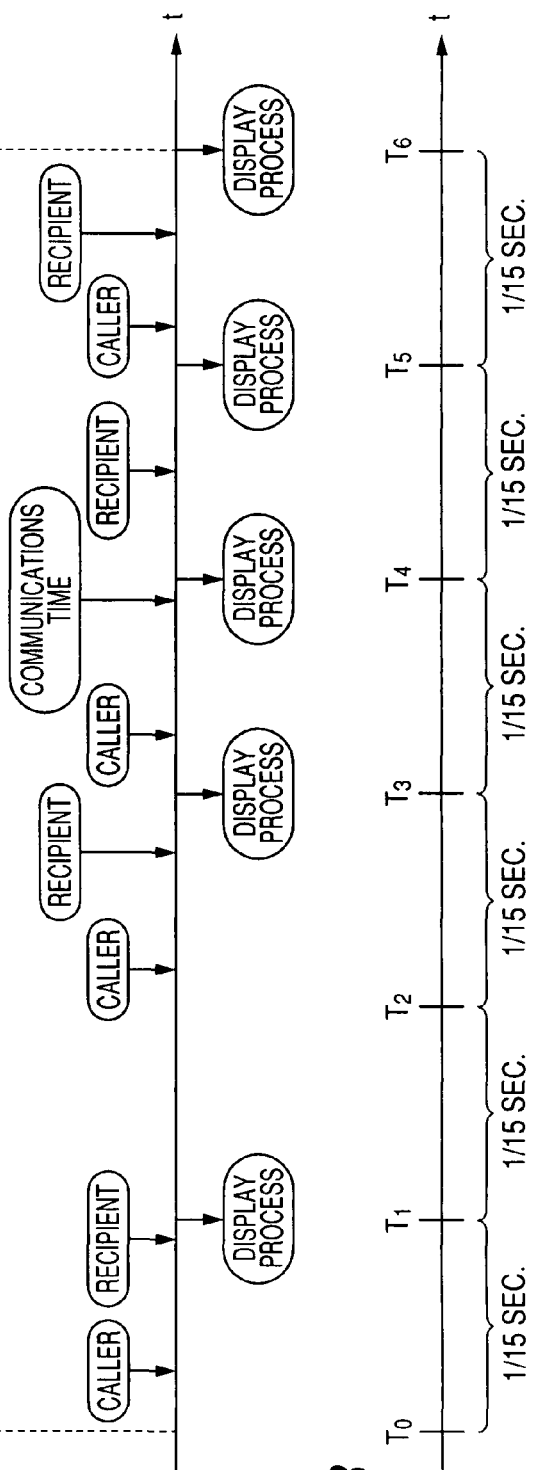

FIGS. 8A and 8B are views showing timing charts of times for updating a caller image, a recipient image, and a communications time, with regard to the case where the display control process, described with reference to the flowchart of FIG. 7, is not executed and the case where the display control process is executed.

As shown in FIG. 8A, when the display control process, described with reference to the flowchart of FIG. 7, is not executed, the display process is executed every time the caller image, the recipient image, or the communications time is updated, and successively, the displays of the caller image, the recipient image, and the communications time are individually updated on the liquid crystal display 17.

Furthermore, as shown in FIG. 8B, when the display control process, described with reference to the flowchart of FIG. 7, is executed, the display process is not executed every time the caller image, the intended caller, image, or the communications time is updated. Instead, at a predetermined time using the display update timer, the displays are updated simultaneously for those have been updated within the preset predetermined time, from among the caller image, the recipient image, and the communications time (i.e., the displays are updated synchronously).

More specifically, during the time between display update timer times $T_0$ and $T_1$, from among the caller image, the recipient image, and the communications time, the caller image and the recipient image are updated within the preset predetermined time. Thus, at the display update timer time $T_1$, the displays are updated with regard to the caller image and the recipient image simultaneously, from among the caller image, the recipient image, and the communications time (i.e., the displays are updated synchronously).

Further, during the time between the display update timer time $T_1$ and $T_2$, none of the caller image, the recipient image, and the communications time are updated within the preset predetermined time. Thus, no display is updated at the display update timer time $T_2$.

In this way, when the display control process, described with reference to the flowchart of FIG. 7, is executed, the number of times for executing the display process (display update process) can be reduced, for example, from 9 times to 5 times during the time between the display update timer times $T_0$ and $T_6$ as shown in FIGS. 8A and 8B.

Figure 9A:
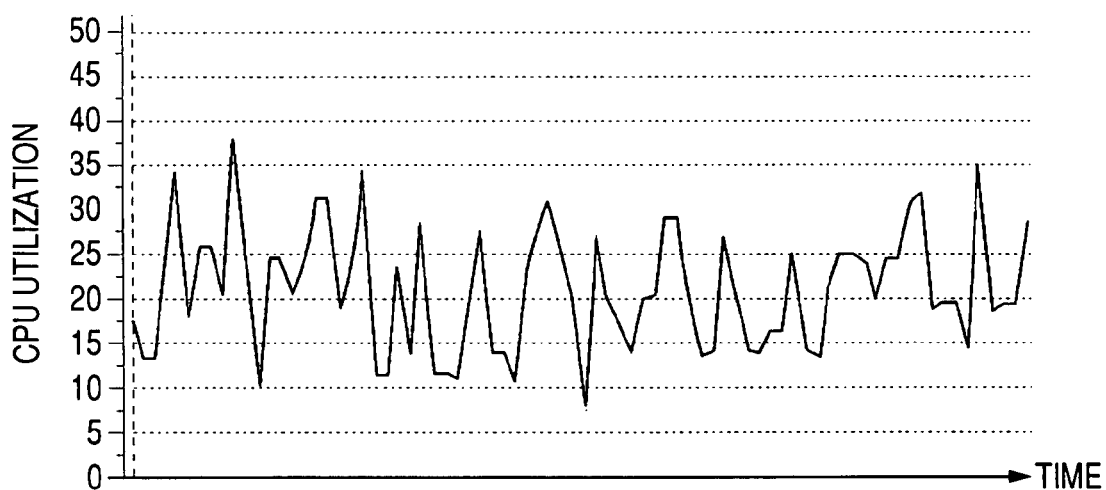
FIGS. 9A and 9B are views showing test results of CPU utilizations in the case where the display control process, described with reference to the flowchart of FIG. 7, is not executed and the case where the display control process is executed.
Figure 9B:
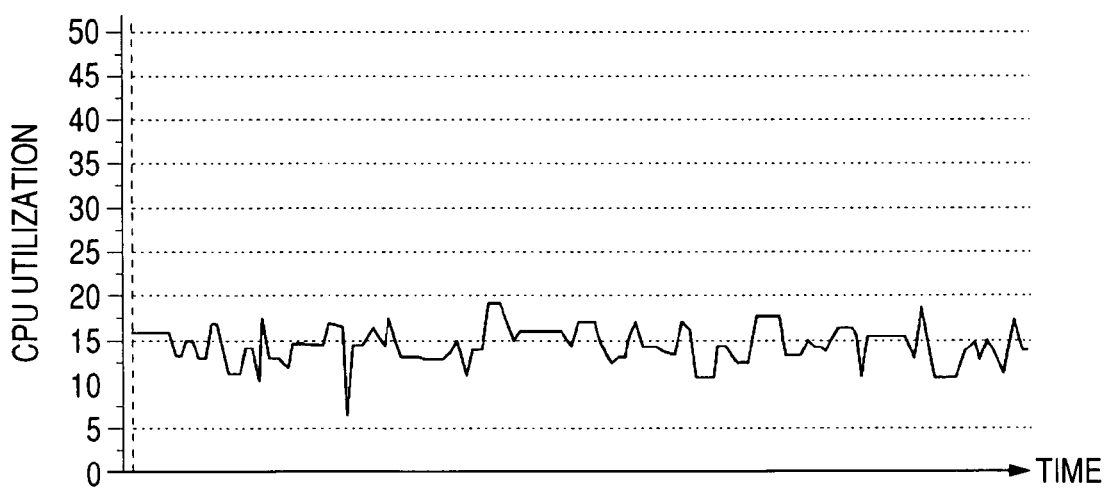

Next, graphs of FIGS. 9A and 9B show utilizations of a CPU in the main control section 31, with regard to the case where the display control process, described with reference to the flowchart of FIG. 7, is not executed and the case where the display control process is executed. Additionally, in the graphs of FIGS. 9A and 9B, the abscissa axis indicates a time, and the ordinate axis indicates a CPU utilization required for the display process.

As shown in FIG. 9A, when the display control process, described with reference to the flowchart of FIG. 7, is not executed, the CPU utilization varies in the range between 10% and 35%. Furthermore, as shown in FIG. 9B, when the display control process, described with reference to the flowchart of FIG. 7, is executed, the CPU utilization varies in the range between 10% and 18%.

This shows, when the display control process, described with reference to the flowchart of FIG. 7, is executed, a reduction in the peak of the CPU utilization is approximately 17% and the CPU utilization per unit time is also reduced, compared to the case where the display control process, described with reference to the flowchart of FIG. 7, is not executed.

In the embodiment of the present invention, every time the recipient image update notification, the caller image update notification, and the communications time update notification are acquired, the recipient image display update flag, the caller image display update flag, and the communications time display update flag are respectively set ON. Further, based on the status of the flags thus set: the recipient image display update flag; the caller image display update flag; and the communications time display update flag, at a preset predetermined time, the displays of the recipient image, the caller image, and the communications time are updated. With the above arrangement, when a plurality of display contents appear on the display section during a videophone call, it becomes possible to update display contents synchronously during the videophone call. This realizes a reduction in the update count of the displays of the content appearing on the display section (liquid crystal display 17) during the videophone call. As a result, the CPU utilization for the display process is reduced, and degradation of the communication quality is suppressed. Further, it also becomes possible to suppress power consumption of a camera-equipped digital cell-phone 3.

This improves the convenience in using a videophone.

In the display control process described with reference to the flowchart of FIG. 7, the display update flags are respectively set ON every time the respective update notifications are acquired. However, for example, when a count of the transmission buffer in use (not shown) (usage level) is high, a relatively large amount of CPU resources needs to be assigned to the transmitting and receiving process. Therefore, if the display update flags are set ON and the display update process is executed every time each update notifications is acquired, the CPU resources are occupied for the display process, with the result that the CPU resources cannot be assigned to the process for transmitting and receiving an image. Eventually, generated RTP (Real time Transport Protocol) packets need to be discarded and an image and voice cannot be transmitted in accordance with a communication regulation, causing degradation in the communication quality.

When the count of the transmission buffer in use (not shown) is high, it may be arranged such that, even if each update notification is acquired, the update notification is discarded and the display update flag is not set ON, so that no display is updated. The following describes a display control process using this method.

With reference to a flowchart of FIG. 10, a description is made for another display control process executed by the LCD control section 36 of the camera-equipped digital cell-phone 3 of FIG. 4. Additionally, the processes in Steps S41 through S42, S44, and S46 through S56 are the same as those in Steps S21 through S22, S24, and S26 through 36 of FIG. 7, and the repetitive description is omitted.

If it is determined in Step S42 that the recipient image update notification supplied from the image decoder 37 has been acquired, the process for setting the recipient image display flag is executed in the camera-equipped digital cell-phone 3. The process for setting the recipient image display update flag is shown in detail in the flowchart of FIG. 11.

With reference to the flowchart of FIG. 11, a description is made in detail as to the process for setting the recipient image display update flag of the camera-equipped digital cell-phone 3 of FIG. 4.

In Step S61, the main control section 31 determines whether the count of the transmission buffer in use (not shown) is larger than a predetermined reference value (e.g., 30 when the maximum size qmax of the transmission buffer is 40, etc.).

If it is determined in Step S61 that the count of the transmission buffer in use (not shown) is larger than a predetermined reference value, the main control section 31 calculates, based on the count of the transmission buffer in use (not shown), an update notification discard time which is a time when an update notification is discarded even if it is acquired.

More specifically, the main control section 31 calculates the update notification discard time which is a time when an update notification is discarded even if it is acquired, using [Formula 1] that is previously defined so as to form a curved line such as, for example, a curved line a shown in the graph of FIG. 12A and based on the count of the transmission buffer in use (not shown).

$$t = \frac{1}{1 + f_{max} - \frac{q \times f_{max}}{q_{max}}} \quad \text{[Formula 1]}$$

where symbols t, q, fmax, and pmax denote the update notification discard time, the count of the transmission buffer in use (not shown), the maximum frame rate, and the maximum size of the transmission buffer, respectively.

In the case of FIGS. 12A and 12B, when fmax is 15, qmax is 40, and the count of the transmission buffer in use q is 38, the update notification discard time is 0.57. Further, when the count of the transmission buffer in use (not shown) q is 38, the update notification discard time is 0.57. That is, the larger the count of the transmission buffer in use (not shown) is, the more CPU resources need to be distributed to the transmitting and receiving process, with the result that the update notification discard time becomes long during which an update notification is discarded even if it is acquired. Indeed, [Formula 1] maybe previously defined so that the update notification discard time becomes long also when the frame rate is high.

In Step S63, the main control section 31 calculates a difference between a time when the previous recipient image update notification is acquired and a time when the current recipient image update notification is acquired.

In Step S64, the main control section 31 determines whether the calculated difference in acquisition time of the recipient image update notifications is not less than the calculated update notification discard time.

More specifically, for example, in the case where fmax is 15, qmax is 40, the count of the transmission buffer in use q (not shown) is 38, and the update notification discard time is 0.57 as shown in FIGS. 12A and 12B, when the calculated difference in acquisition time of the recipient image update notifications is 0.70, it is determined that the difference in acquisition time of the recipient image update notifications is not less than the update notification discard time.

If it is determined in Step S64 that the calculated difference in acquisition time of the recipient image update notifications is not less than the calculated update notification discard time, in Step S65, in accordance with the control of the main control section 31, the LCD main control section 36 sets ON the recipient image display update flag indicating whether to update the display of the recipient image (image of another user as a call recipient).

Thereafter, the process returns to Step S44 of FIG. 10.

If it is not determined in Step S64 that the calculated difference in acquisition time of the recipient image update notifications is not less than the calculated update notification discard time (i.e., if it is determined that the calculated difference in acquisition time of the recipient image update notifications is smaller than the calculated update notification discard time), the process in Step S65 is skipped. That is, the recipient image display update flag, which indicates whether to update the display of the recipient image (image of another user) is maintained as is to be set OFF.

Thereafter, the process returns to Step S44 of FIG. 10.

Furthermore, if it is determined in Step S61 that the count of the transmission buffer in use (not shown) is less than a predetermined reference value (e.g., 30 when the maximum size qmax of the transmission buffer is 40, etc.), the process proceeds to Step S65 and the recipient image display update flag is set ON in Step S65.

Thus, when it is determined that the count of the transmission buffer in use (not shown) is less than a predetermined reference value (e.g., 30 when the maximum size qmax of the transmission buffer is 40, etc.), the transmission buffer usage (not shown) is low. This allows the recipient image display update flag to be set ON in Step S65, and the display to be updated.

Thereafter, the process returns to Step S44 of FIG. 10.

As described above, when the count of the transmission buffer in use (not shown) during the videophone call (usage level) is less than a predetermined reference value, the recipient image display update flag can be set ON every time the recipient image update notification is acquired. Furthermore, when the count of the transmission buffer in use (not shown) (usage level) is higher than a predetermined reference value, an update notification discard time is calculated based on the count of the transmission buffer in use, etc. Then, if it is determined that the difference in acquisition time of the recipient image update notifications is not less than the calculated update notification discard time, the recipient image display update flag is set ON every time the recipient image update notification is acquired. Further, if the difference in acquisition time of the recipient image update notifications is less than the calculated update notification discard time, the update notification is discarded so that the recipient image display update flag cannot be set ON.

With reference returning to FIG. 10, if it is determined in Step S44 that the caller image update notification supplied from the image encoder 34 has been acquired, the process for setting the caller image display update flag is executed in the camera-equipped digital cell-phone 3. The process for setting the caller image display update flag is shown in detail in a flowchart of FIG. 13.

Figure 13:
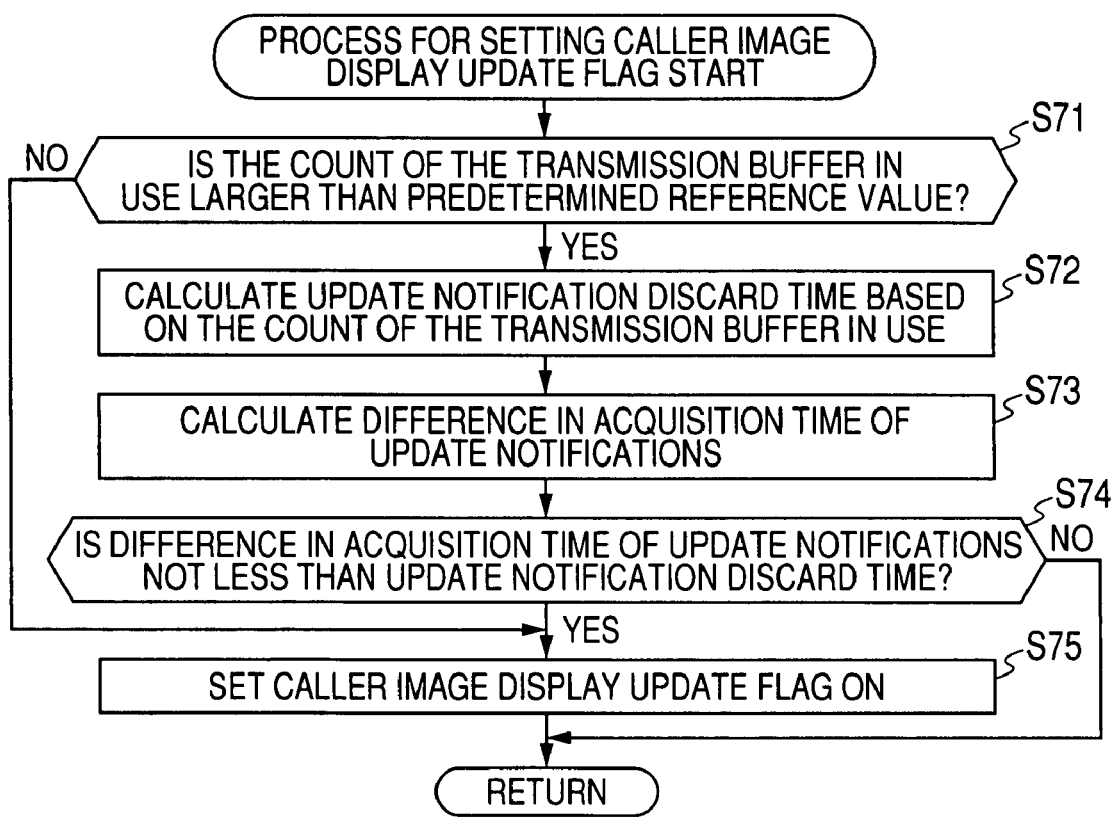
FIG. 13 is a flowchart illustrating a detailed process for setting a recipient image update display flag in Step S45 of FIG. 10.

With reference to the flowchart of FIG. 13, a description is made in detail as to the process for setting the caller image display update flag of the camera-equipped digital cell-phone 3 of FIG. 4.

In Step 571, the main control section 31 determines whether the count of the transmission buffer in use (not shown) is larger than a predetermined reference value (e.g., 30 when the maximum size qmax of the transmission buffer is 40, etc.).

If it is determined in Step S71 that the count of the transmission buffer in use (not shown) is larger than a predetermined reference value, in Step S72, the main control section 31 calculates, based on the count of the transmission buffer in use (not shown), an update notification discard time which is a time when an update notification is discarded even if it is acquired. Additionally, the method for calculating the update notification discard time is the same as the calculation method described in Step S62 of FIG. 11, and the repetitive description is omitted.

In Step S73, the main control section 31 calculates a difference between the acquisition time when the previous caller image update notification is acquired and the acquisition time when the current caller image update notification is acquired.

In Step S74, the main control section 31 determines whether the calculated difference in acquisition time of the caller image update notifications is not less than the calculated update notification discard time.

More specifically, for example, in the case where fmax is 15, qmax is 40, the count of the transmission buffer in use q (not shown) is 38, and the update notification discard time is 0.57 as shown in FIGS. 12A and 12B, when the calculated difference in acquisition time of the caller image update notifications is 0.50, it is determined that the difference in acquisition time of the caller image update notifications is less than the update notification discard time (specifically, it is determined that the difference in acquisition time of the caller image update notifications is smaller than the update notification discard time).

If it is determined in Step S74 that the calculated difference in acquisition time of the caller image update notifications is not less than the calculated update notification discard time, in Step 575, in accordance with the control of the main control section 31, the LCD main control section 36 sets ON the caller image display update flag indicating whether to update the display of a caller image (user self image).

Thereafter, the process returns to Step S46 of FIG. 10.

If it is not determined in Step S74 that the calculated difference in acquisition time of the caller image update notifications is not less than the calculated update notification discard time (i.e., if it is determined that the calculated difference in acquisition time of the caller image update notifications is smaller than the calculated update notification discard time), the process in Step S75 is skipped. That is, the caller image display update flag, which indicates whether to update the display of a caller image (user self image) is maintained as is to be set OFF.

Thereafter, the process returns to Step S46 of FIG. 10.

On the other hand, if it is determined in Step S71 that the count of the transmission buffer in use (not shown) is less than a predetermined reference value (e.g., 30 when the maximum size qmax of the transmission buffer is 40, etc.), the process proceeds to Step 575 and the caller image display update flag is set ON in Step S75.

Thus, when it is determined that the count of the transmission buffer in use (not shown) is less than a predetermined reference value (e.g., 30 when the maximum size qmax of the transmission buffer is 40, etc.), the transmission buffer usage (not shown) is low. This allows the caller image display update flag to be set ON in Step S75, and the display to be updated.

Thereafter, the process returns to Step S47 of FIG. 10.

As described above, when the count of the transmission buffer in use (not shown) during the videophone call (usage level) is less than a predetermined reference value, the caller image display update flag can be set ON every time the caller image update notification is acquired. On the other hand, when the count of the transmission buffer in use (not shown) (usage level) is higher than a predetermined reference value, an update notification discard time is calculated based on the count of the transmission buffer in use, etc. Then, if it is determined that the difference in acquisition time of the caller image update notifications is not less than the calculated update notification discard time, the caller image display update flag is set ON every time the caller image update notification is acquired. Further, if the difference in acquisition time of the caller image update notifications is less than the calculated update notification discard time, the update notification is discarded so that the caller image display update flag cannot be set ON.

In the embodiment of the present invention, when the count of the transmission buffer in use (not shown) (usage level) is low during a videophone call, every time the recipient image update notification, the caller image update notification, and the communications time update notification are acquired, the recipient image display update flag, the caller image display update flag, and the communications time display update flag are respectively set ON. Furthermore, when the count of the transmission buffer in use (not shown) (usage level) is high, the respective update notifications (recipient image update notification, caller image update notification) are discarded depending on the count of the transmission buffer in use (usage level). Further, based on the status of the flags thus set, the recipient image display update flag, the caller image display update flag, and the communications time display update flag, at a preset predetermined time, the displays of the recipient image, the caller image, and the communications time are updated. With the above arrangement, when a plurality of display contents (e.g., recipient image, caller image, and communications time) appear on the display section (liquid crystal display 17) during a videophone call, it becomes possible to update display contents synchronously. This realizes a reduction in the update count of the displays of the content appearing on the display section during the videophone call. As a result, the CPU utilization for the display process is reduced, and degradation of the communication quality is suppressed. Further, it also becomes possible to suppress power consumption of a camera-equipped digital cell-phone 3.

This improves the convenience in using a videophone.

Additionally, the embodiment of the present invention relates to a case where, when the count of the transmission buffer in use (not shown) is high, the update notifications (recipient image update notification, and caller image update notification) are discarded so that no display is updated. However, the embodiment may be arranged such that moving image signal of the user (subject) supplied from the CCD camera 20 is discarded. This realizes a reduction in the amount of RTP packets to be generated for storing the multiplexed signals, enabling to suppress the count of the transmission buffer in use (not shown).

Further, the embodiment of the present invention relates to a case where a moving image signal (reproducing moving image signal) of the user (subject) taken by the CCD camera 20 is once supplied to the encoder 34 and retained, and then the moving image signal is supplied from the image encoder 34 to the LCD control section 36 at a predetermined timing after completion of encoding. However, the embodiment is not limited to this case, and a generated moving image signal may be retained in any location. For example, it may be arranged such that a moving image signal (reproducing moving image signal) of the user (subject) taken by the CCD camera 20 is successively supplied to the LCD control section 36 via the image encoder 34 and retained, and then the moving image signal thus retained is read out at a predetermined timing after completion of encoding, so that the display control process is executed. Further, a moving image signal (reproducing moving image signal) of the user (subject) may be supplied directly from the CCD camera 20 to the LCD control section 36, not via the image encoder 34, so as to be retained in the LCD controller section 36.

Additionally, in the embodiment of the present invention, the built-in display update timer is used to set a predetermined time, for example, $1/15$ second (approximately 66 milliseconds). However, the present invention is not limited to this, and a predetermined time for updating the display may be set based on the maximum frame rate during a videophone call. That is, when the frame rate is set to 7.5 fps depending on the communication conditions, for example, $1/7.59$ seconds (approximately 130 milliseconds) may be set as a predetermined time. This allows the time interval for updating the display to be lengthened, realizing suppression in power consumption of the camera-equipped digital cell-phone 3. Further, by the user's preference and/or communication conditions, a predetermined time may be changed as appropriate.

Further, the embodiment of the present invention relates to a case where the present invention is applied to videophones at two locations. However, the embodiment is not limited to this case, and may be applied to videophones at three or more locations. In this case, the content of the display appeared on the liquid crystal display 17 includes images of a plurality of users. Therefore, with application of the embodiment, it becomes possible to reduce the update count of the content of the display appeared on the display section during a videophone call. This realizes a reduction in the CPU utilization for the display process, thereby suppressing degradation in the communication quality. Further, it also becomes possible to suppress power consumption of a camera-equipped digital cell-phone 3.

Further, the embodiment is applicable to a case where text data, as well as video and voice signals are transmitted and received during a videophone call, and on the liquid crystal display 17, the text data in addition to a recipient image, a caller image, and a communications time are displayed as contents of the display.

Additionally, the embodiment is also applicable to PDAs (Personal Digital Assistant), personal computers, portable music reproducing apparatuses, and other information processing apparatuses besides the camera-equipped digital cell-phone 3.

Further, the series of processes described in the embodiment of the present invention can be executed by hardware as well as by software.

According to the above-described embodiment, when a plurality of display contents appear on a display section during a videophone call, display contents are updated synchronously.

Further, in the embodiment of the present invention, steps in the flowcharts show exemplary processes that are executed in chronological order according to the order in which the steps are described. The processes include those which are executed in parallel or individually even if they are not necessarily executed.

What is claimed is:
1. A mobile terminal comprising:
   a camera configured to acquire first image information;
   a receiving unit configured to receive second image information from outside;
   a display unit configured to display, in a videophone call function, a first image based on the first image information and a second image based on the second image information;
   a first setting unit configured to set a flag of the first image based on the acquisition of the first image information;

a second setting unit configured to set a flag of the second image based on the reception of the second image information; and a display control section configured to confirm at a predetermined updating time, which occurs at a predetermined interval, whether or not at least one of the flag of the first image and the flag of the second image is set and to update a display of the display unit based on the at least one set flag if the at least one of the flag of the first image and the flag of the second image is set, and configured to perform control so as not to update the first image and the second image at a timing other than the predetermined updating time.

2. A mobile terminal comprising:

a camera configured to acquire first image information;

a receiving unit configured to receive second image information from outside;

a display unit configured to display, in a videophone call function, a first image based on the first image information and a second image based on the second image information;

a first setting unit configured to set a flag of the first image based on the acquisition of the first image information;

a second setting unit configured to set a flag of the second image based on the reception of the second image information;

a third setting unit configured to set a flag of a third image based on a request for updating a display of a communication time; and a display control section configured to confirm at a predetermined updating time, which occurs at a predetermined interval, whether or not at least one of the flag of the first image, the flag of the second image, and the flag of the third image is set and to update a display of the display unit based on the at least one set flag if the at least one of the flag of the first image, the flag of the second image, and the flag of the third image is set, and configured to perform control so as not to update the first image, the second image, and the communication time at a timing other than the predetermined updating time.

3. The mobile terminal according to claim 1, further comprising:

a determining unit configured to determine whether or not a count of a transmission buffer in use is larger than a predetermined count, wherein the first setting unit sets the flag of the first image based on the acquisition of the first image information to indicate that a display of the first image should be updated, if the count of the transmission buffer in use is not larger than the predetermined count.

4. The mobile terminal according to claim 1, further comprising:

a determining unit configured to determine whether or not a count of a transmission buffer in use is larger than a predetermined count;

a first calculating unit configured to calculate, based on the count of the transmission buffer in use, an update notification discard time; and a second calculating unit configured to calculate a difference between a time when the first image information was previously acquired via the camera and a time when the first image information is currently acquired via the camera, wherein the first setting unit sets the flag of the first image based on the acquisition of the first image information to indicate that a display of the first image should be updated, in a case in which the count of the transmission buffer in use is larger than the predetermined count and the difference calculated by the second calculating unit is equal to or larger than the update notification discard time.

5. The mobile terminal according to claim 1, further comprising:

a determining unit configured to determine whether or not a count of a transmission buffer in use is larger than a predetermined count;

a first calculating unit configured to calculate, based on the count of the transmission buffer in use, an update notification discard time; and a second calculating unit configured to calculate a difference between a time when the first image information was previously acquired via the camera and a time when the first image information is currently acquired via the camera, wherein the first setting unit does not set the flag of the first image based on the acquisition of the first image information to indicate that a display of the first image should be updated, in a case in which the count of the transmission buffer in use is larger than the predetermined count and the difference calculated by the second calculating unit is smaller than the update notification discard time.

6. The mobile terminal according to claim 1, further comprising:

a determining unit configured to determine whether or not a count of a transmission buffer in use is larger than a predetermined count, wherein the second setting unit sets the flag of the second image based on the reception of the second image information to indicate that a display of the second image should be updated, if the count of the transmission buffer in use is not larger than the predetermined count.

7. The mobile terminal according to claim 1, further comprising:

a determining unit configured to determine whether or not a count of a transmission buffer in use is larger than a predetermined count;

a first calculating unit configured to calculate, based on the count of the transmission buffer in use, an update notification discard time; and a second calculating unit configured to calculate a difference between a time when the second image information was previously received from outside and a time when the second image information is currently received from outside, wherein the second setting unit sets the flag of the second image based on the reception of the second image information to indicate that a display of the second image should be updated, in a case in which the count of the transmission buffer in use is larger than the predetermined count and the difference calculated by the second calculating unit is equal to or larger than the update notification discard time.

8. The mobile terminal according to claim 1, further comprising:

a determining unit configured to determine whether or not a count of a transmission buffer in use is larger than a predetermined count;

a first calculating unit configured to calculate, based on the count of the transmission buffer in use, an update notification discard time; and a second calculating unit configured to calculate a difference between a time when the second image information was previously received from outside and a time when the second image information is currently received from outside, wherein the second setting unit sets the flag of the second image based on the reception of the second image information to indicate that a display of the second image should be updated, in a case in which the count of the transmission buffer in use is larger than the predetermined count and the difference calculated by the second calculating unit is smaller than the update notification discard time.

9. A cell-phone comprising:

a camera to acquire first image information;

a radio communication unit to receive second image information over a wireless link;

a display unit to display a first image obtained from the first image information and a second image obtained from the second information, when the cell-phone is executing videophone communication;

a detecting unit to detect a request for updating at least one of the first image and the second image; and a display controller to check, at an updating timing that recurs in accordance with an updating cycle, whether update information has been set that indicates that the detecting unit has detected at least one request for updating at least one of the first image and the second image after a previous updating timing, and to update at least one of the first image and the second image displayed on the display unit in accordance with the update information if the update information is set.

10. The cell-phone according to claim 9, wherein the display controller is configured not to update the first image and the second image at the updating timing, if no update information is set at the updating timing.

11. The cell-phone according to claim 9, wherein the updating cycle is constant.

12. A cell-phone comprising:

a camera to acquire first image information;

a radio communication unit to receive second image information over a wireless link;

a display unit to display a first image obtained from the first image information, a second image obtained from the second information, and a communication time, when the cell-phone is executing videophone communication;

a detecting unit to detect a request for updating at least one of the first image, the second image, and the communication time; and a display controller to check, at an updating timing that recurs in accordance with an updating cycle, whether update information has been set that indicates that the detecting unit has detected at least one request for updating at least one of the first image, the second image and the communication time after a previous updating timing, and to update at least one of the first image, the second image and the communication time displayed on the display unit in accordance with the update information if the update information is set.

13. The cell-phone according to claim 12, wherein the display controller is configured not to update the first image, the second image, and the communication time at the updating timing, if no update information is set at the updating timing.

14. The cell-phone according to claim 12, wherein the updating cycle is constant.

* * * * *